United States Patent
Ikenaka et al.

(10) Patent No.: US 7,855,945 B2
(45) Date of Patent: Dec. 21, 2010

(54) OPTICAL PICKUP APPARATUS AND OPTICAL ELEMENT

(75) Inventors: Kiyono Ikenaka, Hino (JP); Yuichi Atarashi, Hachioji (JP)

(73) Assignee: Konica Corporation, Tokyo (JP)

( * ) Notice: Subject to any disclaimer, the term of this patent is extended or adjusted under 35 U.S.C. 154(b) by 1185 days.

(21) Appl. No.: 11/490,808

(22) Filed: Jul. 21, 2006

(65) Prior Publication Data

US 2006/0256673 A1 Nov. 16, 2006

Related U.S. Application Data

(62) Division of application No. 10/651,679, filed on Aug. 29, 2003, now Pat. No. 7,577,077.

(30) Foreign Application Priority Data

| Sep. 5, 2002 | (JP) | ............................. 2002-260636 |
| Dec. 18, 2002 | (JP) | ............................. 2002-366642 |
| Jul. 3, 2003 | (JP) | ............................. 2003-191060 |
| Jul. 25, 2003 | (JP) | ............................. 2003-201863 |

(51) Int. Cl.
*G11B 7/00* (2006.01)

(52) U.S. Cl. .............................. 369/112.07; 369/112.12; 369/112.03

(58) Field of Classification Search ........................ None
See application file for complete search history.

(56) References Cited

U.S. PATENT DOCUMENTS

| 6,304,541 | B1 * | 10/2001 | Chang et al. ............ 369/112.06 |
| 6,545,823 | B2 * | 4/2003 | Kitahara ..................... 359/738 |
| 6,594,222 | B2 * | 7/2003 | Maruyama ............. 369/112.26 |
| 6,807,019 | B2 * | 10/2004 | Takeuchi et al. ............ 359/742 |
| 6,807,139 | B2 * | 10/2004 | Sakamoto .............. 369/112.07 |
| 6,834,036 | B1 * | 12/2004 | Shiono et al. .......... 369/112.03 |
| 6,870,805 | B1 * | 3/2005 | Arai et al. .............. 369/112.07 |
| 2002/0012313 | A1 * | 1/2002 | Kimura et al. ......... 369/112.08 |
| 2002/0107980 | A1 * | 8/2002 | Kawaguchi ................. 709/238 |
| 2002/0181367 | A1 * | 12/2002 | Ogasawara .............. 369/53.19 |

* cited by examiner

*Primary Examiner*—Joseph H Feild
*Assistant Examiner*—Tawfik Goma
(74) *Attorney, Agent, or Firm*—Cohen Pontani Lieberman & Pavane LLP

(57) ABSTRACT

An optical pickup apparatus comprises first, second and third light sources to emit light fluxes of wavelength $\lambda 1$, $\lambda 2$ and $\lambda 3$ for conducting recording and/or reproducing information for first, second and third optical information recording mediums having respective protective substrates of thickness t1, t2 and t3 and a diffractive optical element located on a common optical path for the first, second and third light sources. A converged-light spot is formed on the first optical information recording medium with m-th order diffracted-light ray of the wavelength $\lambda 1$, on the second optical information recording medium with n-th order diffracted-light ray of the wavelength $\lambda 2$, and on the third optical information recording medium with k-th order diffracted-light ray of the wavelength $\lambda 3$ generated by the diffractive optical element respectively, wherein one of m, n and k is different from one of other two numbers.

5 Claims, 19 Drawing Sheets

FIG. 16

EXAMPLE 1

WAVE-FRONT ABERRATION AND DIFFRACTION
EFFICIENCY FOR EACH FORMAT

|  | ADD | DVD | CD |
|---|---|---|---|
| WAVE-FRONT ABERRATION | 0.009 λ rms | 0.014 λ rms | 0.014 λ rms |
| DIFFRACTION EFFICIENCY | 96% | 85% | 46% |

FIG. 21

EXAMPLE 2

WAVE-FRONT ABERRATION AND DIFFRACTION EFFICIENCY FOR EACH FORMAT

|  | ADD | DVD | CD |
| --- | --- | --- | --- |
| WAVE-FRONT ABERRATION | 0.011 $\lambda$ rms | 0.022 $\lambda$ rms | 0.033 $\lambda$ rms |
| DIFFRACTION EFFICIENCY | 99% | 91% | 46% |

OPTICAL PICKUP APPARATUS AND OPTICAL ELEMENT

RELATED APPLICATIONS

This is a division of application Ser. No. 10/651,679 filed Aug. 29, 2003 now U.S. Pat. No. 7,577,077.

BACKGROUND OF THE INVENTION

The present invention relates to an optical pickup device and no an objective optical element used for the optical pickup device, and in particular, to an optical pickup device complying with standards of a plurality of optical information recording media (optical discs) and to an objective optical element used for the optical pickup device.

Up to the present, there have been developed and manufactured optical pickup devices (which are also called optical heads or optical head devices) for conducting reproducing and recording of information for optical information recording media (which are also called optical discs or media) such as CD (compact disc) and DVD (digital video disc or digital versatile disc), and they have come into wide use generally.

In recent years, there have been made studies and developments for standards of optical information recording media which make high density information recording possible.

The optical pickup device of this kind converges a light flux emitted from a light source (a laser diode is mainly used) on an information recording surface of an optical disc through an optical system (composed of optical elements such as a beam regulating prism, a collimator, a beam splitter and an objective optical element) to form a spot, and then, converges reflected light from an information-recorded hole (which is also called a pit) on a sensor through the optical system again to reproduce information by converting into electric signals. In this case, a light flux of the reflected light varies depending on a form of the information-recorded hole, and therefore, by using this, information of "0" is distinguished from that of "1". Incidentally, on an information recording surface of the optical disc, there is provided a protective substrate (a protective layer made of plastic which is also called a cover glass).

Further, when recording information on a recording type medium such as CD-R or CD-RW, a spot by means of a laser light source is formed on a recording surface to generate thermochemical changes in a recording material on the recording surface. Due to this, in the case of CD-R, irreversible changes are caused on thermo-diffusive dyes, and a shape identical to the information-recorded hole is formed. In the case of CD-RW wherein a phase change type material is used, reversible changes are made by thermochemical changes between the state of crystal and the amorphous state, and thereby, it is possible to rewrite information.

In the optical pickup device for reproducing information from an optical disc that is in compliance with CD standards, NA of an objective lens is about 0.45 and a wavelength of a working light source is about 785 nm. For recording, on the other hand, those with about 0.50 are usually used. Incidentally, a thickness of a protective substrate of an optical disc complying with CD standards is 1.2 mm.

As an optical information recording medium, CD has been popularized widely, and in recent years, there has been diffused DVD. The DVD is one wherein a capacity for information storage has been increased by making a protective substrate to be thinner and by making an information-recorded hole to be smaller, than those of CD, and a recording capacity of DVD is as large as about 4.7 GB (gigabyte) for that of CD which is about 600-700 MB (megabyte), and DVD is used in many cases as a distributed medium wherein an animation image such as a movie is recorded.

In the optical pickup device for reproducing information from an optical disc that is in compliance with DVD standards, NA of an objective lens is about 0.60 and a wavelength of a working light source is about 655 nm, because the information-recorded hole is small as stated above, although the principle of DVD is the same as that of CD. For recording, on the other hand, those with about 0.65 are usually used. Incidentally, a thickness of a protective substrate of an optical disc complying with DVD standards is 0.6 mm.

With respect to the optical disc in compliance with DVD standards, those of a recording type have already been put to practical use, and there are respective standards including DVD-RAM, DVD-RW/R and DVD+RW/R. Technical principles for these are the same as those in the case of CD standards.

An optical disc of a higher density and higher capacity type is now being proposed as stated above.

This is one employing mainly the so-called violet laser light source having a wavelength of about 405 nm.

With respect to the "high density optical disc" of this kind, a thickness of a protective substrate, a storage capacity and NA are not determined uniformly, even when a wording wavelength is determined.

If the direction for improving recording density substantially, a thickness of a protective substrate of the optical disc is required to be thin and NA is required to be great accordingly. On the contrary, it is also possible to make the thickness of a protective substrate and NA to be the same the standards of the conventional optical disc such as DVD. In that case, properties required as an optical system are relatively generous, though physical recording density is not improved substantially.

Specifically, with respect to a thickness of the protective substrate, a thickness that is further thinned to be as thin as 0.1 mm and a thickness of 0.6 mm that is identical to that of DVD have been proposed.

Though the plural standards for the "high density optical disc" of this kind are the same in principle as those for CD and DVD, if a thickness of the protective substrate is different, a size of the information-recorded hole is also different. Therefore, even if a light source having the same wavelength is used, it is not possible to conduct reproducing and recording of information by using the same optical pickup device simply.

Therefore, some problems need to be solved for attaining "compatibility" which makes it possible to conduct reproducing and recording of information for both "high density optical disc" and conventional plural standards, with a single optical pickup device including an objective optical element.

(1) Since an appropriate NA varies depending on each optical disc, "diaphragm" functions to use respective NA selectively for media are required.

(2) On optical discs each having a different thickness of a protective substrate, spherical aberrations are caused by the thickness difference, which needs to be solved.

In particular, extremely remarkable spherical aberration is caused for the difference between a thickness of 0.6 mm for DVD and that of 1.2 mm for CD. Further, when a thickness of the protective substrate of "high density optical disc" is made to be 0.1 mm, further correction of spherical aberration is needed.

For these problems, there have been proposed a method to use a dichroic filter having a property to select wavelengths and a method to give a property to select wavelengths by providing a diffractive structure or an optical path difference furnishing structure on an objective optical element, and they have been realized.

There also exist the following problems.

(3) When attaining "compatibility" between standards of optical discs wherein a thickness of a protective substrate and NA are the same (including mostly the same) for both optical discs and a working wavelength is different (for example, when using 655 nm and 405 nm), occurrence of spherical aberration (=spherical aberration equivalent to an amount of chromatic aberration) caused by the wavelength difference is unavoidable, although spherical aberration caused by a difference of protective substrate thickness does not occur, which needs to be solved.

(4) With respect to light fluxes to enter an objective optical element, when all light fluxes are collimated to be infinite parallel light even when a wavelength is different, spherical aberration based on a magnification difference is not caused, but in the case of finite light (divergent light and convergent light), a difference of magnification is caused, and spherical aberration based on this difference of magnification is caused.

(5) When attaining "compatibility" for three formats of CD, DVD and "high density optical disc" by using a single optical pickup device, it is necessary to conduct spherical aberration correction which is more complicated than the occasion for "compatibility" between two formats. In other words, corrections need to be made 'between CD and DVD', 'between CD and "high density optical disk"' and 'between DVD and "high density optical disk"', for the correction only between CD and DVD in the case of two formats.

In Patent Document 1, there is disclosed a compatible optical pickup device that is compatible between the "high density optical disc" and DVD both mentioned in the present invention, which has an optical element having a diffractive structure in its optical path, and forms a converged-light spots by diffracted light with different orders such as second order diffraction for "high density optical disk" and first order diffraction for DVD or third order diffraction for "high density optical disk" and second order diffraction for DVD.

However, there is neither disclosure nor suggestion for technologies coping with three types of formats such as those in the present invention.

(Patent Document 1)

TOKKAI No. 2001-93179

As stated above, for "compatibility" between different optical discs, there have been proposed a method to use a dichroic filter having a property to select wavelengths and a method to give a property to select wavelengths by providing a diffractive structure on an objective optical element, and they have been realized.

However, there is a fear that optical performances are not attained when an objective optical element is made to have various optical functions, although it is preferable for reduction of the number of parts, low cost and downsizing.

When attaining the compatibility for three formats which is to be solved this time, it is impossible to solve by using simply the aforesaid methods, because of many objects to be corrected.

Further, spherical aberration is sometimes caused also by the magnification of a light flux entering an objective optical element, which needs to be solved.

Since the optical pickup device itself is required to be small in size, light in weight and thin in thickness, factor parts, in particular, optical elements are required to have strict capabilities.

When the optical pickup device is made thin, in particular, a working distance (distance from an objective optical element to an optical disc) becomes short. Even if the working distance is made to be great by enhancing the magnification, image height characteristics are worsened, which is not preferable. If a difference of working distances is great, a load on an actuator is increased, and power consumption is also increased.

In Patent Document 2, there is disclosed an optical disc device that is approximately composed of the first-third light sources which emit light respectively of the first-third wavelengths, an objective lens that receives light of the first-third wavelengths respectively to converge them on a prescribed optical information recording medium and of a collimator lens.

Light having respectively the first and the second wavelengths emitted respectively from the first and the second light sources pass through the collimator lens, and in this case, light with the first wavelength is collimated by the collimator lens to be parallel light and enters the objective lens, while, light with the second wavelength is not collimated and enters the objective lens as divergent light. Further, light with the third wavelength emitted from the third light source does not pass through the collimator lens and enters the objective lens directly as a divergent light.

Light each having one of the first-third wavelengths emerging from the objective lens is converged on each of three types of optical information recording media such as a high density optical disk, DVD and CD, each having a different wavelength and a different protective substrate thickness, thus, recording and/or reproducing for various types of information is conducted.

(Patent Document 2)

TOKKAI No. 2001-43559

Incidentally, in the apparatus disclosed in Patent Document 2, light with the first wavelength enters an objective lens as a parallel light as stated above, while, light with the second wavelength and light with the third wavelength enter the objective lens as divergent light, and thus, an optical system magnification of a light-converging optical system is different from others for three types of optical information recording media.

Therefore, for example, an optical path for light with each of the first-third wavelengths is different from others, and therefore, a plurality of optical elements are required to be arranged so that each of them may correspond to each optical path, and thereby, there have been problems that a structure of an optical disc device is complicated and the number of parts of the apparatus is increased.

Further, there have been problems that image height characteristics are worsened and various aberrations such as coma and astigmatism are caused, in the case of tracking to move an objective lens for an optical disc when conducting reproducing and recording for the optical disc, because divergent light enters the objective lens.

There has further been a problem that spherical aberration caused by temperature changes is greater, compared with the so-called apparatus of an infinity system type wherein parallel light enters an objective lens.

SUMMARY OF THE INVENTION

An object of the invention is to provide an optical pickup device and an optical element to be used for reproducing and/or recording of information for three types of optical information recording media each having a different wavelength and a different protective substrate thickness wherein the aforementioned problems are taken into consideration, various types of aberrations are inhibited, and the number of parts can be reduced.

(Item 1-1)

An optical pickup device conducting reproducing and/or recording of information by using a light flux emitted from a first light source having wavelength $\lambda 1$ for the first optical information recording medium having protective substrate thickness t1, conducting reproducing and/or recording of information by using a light flux emitted from a second light source having wavelength $\lambda 2$ ($\lambda 1<\lambda 2$) for the second optical information recording medium having protective substrate thickness t2 (t1$\leqq$t2), and conducting reproducing and/or recording of information by using a light flux emitted from a third light source having wavelength $\lambda 3$ ($\lambda 2<\lambda 3$) for the third optical information recording medium having protective substrate thickness t3 (t2<t3), wherein when conducting reproducing and/or recording of information for the first, second and third optical information recording media, a light flux of infinite parallel rays is made to enter an objective optical element included in the optical pickup device, and the optical pickup device is provided with a diffractive optical element that is arranged in a common optical path for the first, second and third light sources and has a diffractive structure, and is constituted so that a converged-light spot is formed on the first optical information recording medium by the $m^{th}$ order diffracted light (m is a natural number) generated by the diffractive optical element, and a converged-light spot is formed on the second optical information recording medium by the $n^{th}$ order diffracted light (n is a natural number satisfying n$\neq$m) generated by the diffractive optical element.

(Item 1-2)

The optical pickup device described in Item 1-1 wherein the diffractive optical element is the objective optical element.

(Item 1-3)

The optical pickup device described in Item 1-1 wherein the diffractive optical element is a collimator.

(Item 1-4)

The optical pickup device described in Item 1-1 wherein the diffractive optical element is an optical element provided separately from the objective optical element and the collimator.

(Item 1-5)

An optical pickup device conducting reproducing and/or recording of information by using a light flux emitted from a first light source having wavelength $\lambda 1$ for the first optical information recording medium having protective substrate thickness t1, conducting reproducing and/or recording of information by using a light flux emitted from a second light source having wavelength $\lambda 2$ ($\lambda 1<\lambda 2$) for the second optical information recording medium having protective substrate thickness t2 (t1$\leqq$t2), and conducting reproducing and/or recording of information by using a light flux emitted from a third light source having wavelength $\lambda 3$ ($\lambda 2<\lambda 3$) for the third optical information recording medium having protective substrate thickness t3 (t2$\leqq$t3), wherein the optical pickup device is provided with a first compatible optical element arranged in a common optical path for the first, second and third light sources and with a second compatible optical element arranged in an optical path for one light source among the first, second and third light sources or in a common optical path for certain two light sources, and the first compatible optical element has a first compatible function for forming a converged-light spot necessary for conducting reproducing and/or recording of information for at least one optical information recording medium among the first, second and third optical information recording media, and the second compatible optical element has, by combining with the first compatible optical element, a second compatible function for forming a converged-light spot necessary for conducting reproducing and/or recording of information for other optical information recording media among the first, second and third optical information recording media, and the optical pickup device is provided with a diffractive optical element that is arranged in a common optical path for the first, second and third light sources and has a diffractive structure, and is constituted so that a converged-light spot is formed on the first optical information recording medium by the $m^{th}$ order diffracted light (m is a natural number) generated by the diffractive optical element, and a converged-light spot is formed on the second optical information recording medium by the $n^{th}$ order diffracted light (n is a natural number satisfying n$\neq$m) generated by the diffractive optical element.

(Item 1-6)

The optical pickup device described in Item 1-5, wherein the first compatible optical element is an objective optical element.

(Item 1-7)

The optical pickup device described in Item 1-5, wherein the second compatible optical element is a dichroic filter.

(Item 1-8)

The optical pickup device described in either one of Item 1-5 and Item 1-6 wherein the second compatible optical element is a liquid crystal element.

(Item 1-9)

The optical pickup device described in either one of Item 1-5 and Item 1-6 wherein the second compatible optical element is a diffractive optical element.

(Item 1-10)

The optical pickup device described in either one of Item 1-5-Item 1-9 wherein, when conducting reproducing and/or recording of information for optical information recording media, a light flux having the same magnification is made to enter an objective optical element for all of the first, second and third optical information recording media, and the first and second compatible functions correct spherical aberration based on a wavelength difference and spherical aberration based on a difference of protective substrate thickness between optical information recording media.

(Item 1-11)

The optical pickup device described in either one of Item 1-5-Item 1-9 wherein, when conducting reproducing and/or recording of information for optical information recording media, a light flux having the different magnification is made to enter an objective optical element for all of the first, second and third optical information recording media, and the first and second compatible functions correct spherical aberration based on a wavelength difference, spherical aberration based on a difference of protective substrate thickness between optical information recording media and spherical aberration based on a difference of magnification of the light flux entering the objective optical element.

(Item 1-12)

The optical pickup device described in either one of Item 1-1-Item 1-11 wherein m is equal to 2.

(Item 1-13)

The optical pickup device described in either one of Item 1-1-Item 1-12 wherein n is equal to 1.

(Item 1-14)

The optical pickup device described in either one of Item 1-1-Item 1-13 wherein a converged-light spot by $n^{th}$ order diffracted light generated by the diffractive optical element is formed on the third optical information recording medium.

(Item 1-15)

The optical pickup device described in either one of Item 1-1-Item 1-14 wherein there is provided an optical correcting structure for conducting temperature compensation and/or chromatic aberration compensation.

(Item 1-16)

An optical pickup device conducting reproducing and/or recording of information by using a light flux emitted from a first light source having wavelength $\lambda 1$ for the first optical information recording medium having protective substrate thickness t1, conducting reproducing and/or recording of information by using a light flux emitted from a second light source having wavelength $\lambda 2$ ($\lambda 1<\lambda 2$) for the second optical information recording medium having protective substrate thickness t2 (t1$\leqq$t2), and conducting reproducing and/or recording of information by using a light flux emitted from a third light source having wavelength $\lambda 3$ ($\lambda 2<\lambda 3$) for the third optical information recording medium having protective substrate thickness t3 (t2$\leqq$t3), wherein the optical pickup device is equipped with a diffractive optical element arranged in a common optical path for the first, second and third light sources and with a compatible optical element which is arranged to be closer to a light source than the diffractive optical element is, and can switch optical function for each wavelength, and when conducting reproducing and/or recording of information for the first, second and third optical information recording media, a light flux of infinite parallel rays is made to enter the compatible optical element, while, the diffractive optical element forms a converged-light spot that is sufficient for conducting reproducing and/or recording of information on at least the first optical information recording medium and generates diffracted light with an order different from that of the light flux with $\lambda 1$ for the light flux with $\lambda 2$ or the light flux with $\lambda 3$, and the compatible optical element generates an optical function that is different from the optical function of the light flux with $\lambda 1$ on the second optical information recording medium and the third optical information recording medium and forms, when combined with the optical function of the diffractive optical element, a converged-light spot that is sufficient for conducting reproducing and/or recording of information on the second optical information recording medium and the third optical information recording medium.

(Item 1-17)

An optical pickup device conducting reproducing and/or recording of information by using a light flux emitted from a first light source having wavelength $\lambda 1$ for the first optical information recording medium having protective substrate thickness t1, conducting reproducing and/or recording of information by using a light flux emitted from a second light source having wavelength $\lambda 2$ ($\lambda 1<\lambda 2$) for the second optical information recording medium having protective substrate thickness t2 (t1$\leqq$t2), and conducting reproducing and/or recording of information by using a light flux emitted from a third light source having wavelength $\lambda 3$ ($\lambda 2<\lambda 3$) for the third optical information recording medium having protective substrate thickness t3 (t2$\leqq$t3), wherein the optical pickup device is equipped with a diffractive optical element arranged in a common optical path for the first, second and third light sources and with a compatible optical element which is arranged to be closer to a light source than the diffractive optical element is, and can switch optical function for each wavelength, and when conducting reproducing and/or recording of information for the first, second and third optical information recording media, a light flux of infinite parallel rays is made to enter the compatible optical element, while, the diffractive optical element forms a converged-light spot necessary for conducting reproducing and/or recording of information by means of diffracted light each having a different diffraction order, on two optical information recording media among the first, second and third optical information recording media, and the compatible optical element generates an optical function that is different from the optical function of the light flux with $\lambda 1$ on the second optical information recording medium and the third optical information recording medium, and forms, when combined with the optical function of the diffractive optical element, a converged-light spot that is necessary for conducting reproducing and/or recording of information on the other optical information recording medium among the second optical information recording medium and the third optical information recording medium.

(Item 1-18)

The optical pickup device described in either one of Item 1-16 and Item 1-17 wherein the diffractive optical element is an objective optical element.

(Item 1-19)

The optical pickup device described in Item 1-18 wherein the objective optical element is a single lens.

(Item 1-20)

The optical pickup device described in Item 1-18 wherein the objective optical element is a multi-lens.

(Item 1-21)

The optical pickup device described in either one of Items 1-16-1-20 wherein the compatible optical element does not generate optical function on the light flux with $\lambda 1$.

(Item 1-22)

The optical pickup device described in either one of Item 1-s 16-20 wherein the compatible optical element is a liquid crystal element.

(Item 1-23)

The optical pickup device described in Item 1-22 wherein optical functions are switched by making the state of energization to be different by a wavelength of a light flux entering the liquid crystal element.

(Item 1-24)

The optical pickup device described in either one of Item 1-s 16-20 wherein the compatible optical element is a movable beam expander.

(Item 1-25)

The optical pickup device described in Item 1-24 wherein optical functions are switched by moving the beam expander in the direction of an optical axis depending on a wavelength of an entering light flux.

(Item 1-26)

The optical pickup device described in either one of Items 1-16-1-25 wherein the diffractive optical element and the compatible optical element are unified to be held and driven by a single driving means.

(Item 1-27)

The optical pickup device described in either one of Item 1-s 16-26 wherein the diffracting surface is of the multi-level structure.

(Item 1-28)

The optical pickup device described in either one of Item 1-s 16 and Item 1-s 18-27 wherein the diffractive optical element forms a converged-light spot which is insufficient for conducting reproducing and/or recording of information on the second and third optical information recording media.

(Item 1-29)

The optical pickup device described in Item 1-16 wherein $k^{th}$ order (k is a natural number) diffracted light is generated for the light flux with $\lambda 1$, $m^{th}$ order (m is a natural number satisfying m≠k) diffracted light is generated for the light flux with $\lambda 2$ and $n^{th}$ order (n is a natural number satisfying n≠k) diffracted light is generated for the light flux with $\lambda 1$, all by the diffractive optical element.

(Item 1-30)

The optical pickup device described in Item 1-18 wherein m≠n holds.

(Item 1-31)

The optical pickup device described in Item 1-18 wherein m=n holds.

(Item 1-32)

The optical pickup device described in Item 1-30 wherein k=1, m=0 and n=2 hold.

(Item 1-33)

The optical pickup device described in Item 1-31 wherein k=2, m=1 and n=1 hold.

(Item 1-34)

The optical pickup device described in Item 1-30 wherein k=2, m=1 and n=0 hold.

(Item 1-35)

The optical pickup device described in Item 1-30 wherein k=2, m=2 and n=1 hold.

(Item 1-36)

The optical pickup device described in Item 1-31 wherein k=3, m=2 and n=2 hold.

(Item 1-37)

The optical pickup device described in Item 1-30 wherein k=4, m=3 and n=2 hold.

(Item 1-38)

The optical pickup device described in Item 1-30 wherein k=5, m=3 and n=2 hold.

(Item 1-39)

The optical pickup device described in Item 1-31 wherein k=5, m=3 and n=3 hold.

(Item 1-40)

The optical pickup device described in Item 1-30 wherein k=6, m=4 and n=3 hold.

(Item 1-41)

The optical pickup device described in Item 1-31 wherein k=7, m=4 and n=4 hold.

(Item 1-42)

The optical pickup device described in Item 1-30 wherein k=8, m=5 and n=4 hold.

(Item 1-43)

The optical pickup device described in Item 1-17 wherein the diffractive optical element has a diffracting surface that forms, using diffracted light each having a different order number, converged-light spots necessary for conducting reproducing and/or recording of information on the first and second optical information recording media.

(Item 1-44)

The optical pickup device described in Item 1-43 wherein the diffracting surface is provided on the total area of the optical functional surface of the diffractive optical element, and the diffracting surface corrects spherical aberration based on a wavelength difference between the wavelength $\lambda 1$ and the wavelength $\lambda 2$.

(Item 1-45)

The optical pickup device described in either one of Item 1-43 and Item 1-44 wherein the compatible optical element corrects spherical aberration caused by a difference of substrate thickness between substrate thickness t1 and substrate thickness t3 and spherical aberration caused by a wavelength difference between the wavelength $\lambda 1$ and the wavelength $\lambda 3$.

(Item 1-46)

The optical pickup device described in either one of Items 1-43-1-45 wherein $k^{th}$ (k is a natural number) order diffracted light is generated for the light flux with $\lambda 1$, $m^{th}$ (m is a natural number satisfying m≠) order diffracted light is generated for the light flux with $\lambda 2$, and $n^{th}$ (n is a natural number satisfying n≠k) order diffracted light is generated for the light flux with $\lambda 1$, all by the diffractive optical element.

(Item 1-47)

The optical pickup device described in Item 1-46 wherein m≠n holds.

(Item 1-48)

The optical pickup device described in Item 1-46 wherein m=n holds.

(Item 1-49)

The optical pickup device described in Item 1-47 wherein k=1, m=0 and n=2 hold.

(Item 1-50)

The optical pickup device described in Item 1-48 wherein k=2, m=1 and n=1 hold.

(Item 1-51)

The optical pickup device described in Item 1-47 wherein k=2, m=1 and n=0 hold.

(Item 1-52)

The optical pickup device described in Item 1-47 wherein k=2, m=2 and n=1 hold.

(Item 1-53)

The optical pickup device described in Item 1-48 wherein k=3, m=2 and n=2 hold.

(Item 1-54)

The optical pickup device described in Item 1-47 wherein k=4, m=3 and n=2 hold.

(Item 1-55)

The optical pickup device described in Item 1-47 wherein k=5, m=3 and n=2 hold.

(Item 1-56)

The optical pickup device described in Item 1-48 wherein k=5, m=3 and n=3 hold.

(Item 1-57)

The optical pickup device described in Item 1-47 wherein k=6, m=4 and n=3 hold.

(Item 1-58)

The optical pickup device described in Item 1-48 wherein k=7, m=4 and n=4 hold.

(Item 1-59)

The optical pickup device described in Item 1-47 wherein k=8, m=5 and n=4 hold.

(Item 1-60)

The optical pickup device described in Item 1-17 wherein the diffractive optical element has a diffracting surface that forms, using diffracted light each having a different order number, converged-light spots necessary for conducting reproducing and/or recording of information on the first and third optical information recording media.

(Item 1-61)

The optical pickup device described in Item 1-60 wherein the diffracting surface is provided on the total area of the optical functional surface of the diffractive optical element, and the diffracting surface corrects spherical aberration based on a substrate thickness difference between substrate thickness t1 and substrate thickness t3 and spherical aberration based on a wavelength difference between the wavelength $\lambda 1$ and the wavelength $\lambda 3$.

(Item 1-62)

The optical pickup device described in either one of Item 1-s 60 and 61 wherein the compatible optical element corrects spherical aberration based on a wavelength difference between the wavelength $\lambda 1$ and the wavelength $\lambda 2$.

(Item 1-63)

The optical pickup device described in either one of Item 1-s 60-62 wherein $k^{th}$ (k is a natural number) order diffracted light is generated for the light flux with $\lambda 1$, $m^{th}$ (m is a natural number satisfying m≠k) order diffracted light is generated for the light flux with $\lambda 2$, and $n^{th}$ (n is a natural number satisfying n≠k) order diffracted light is generated for the light flux with $\lambda 1$, all by the diffractive optical element.

(Item 1-64)

The optical pickup device described in Item 1-63 wherein m≠n holds.

(Item 1-65)

The optical pickup device described in Item 1-63 wherein m=n holds.

(Item 1-66)

The optical pickup device described in Item 1-64 wherein k=1, m=0 and n=2 hold.

(Item 1-67)

The optical pickup device described in Item 1-64 wherein k=2, m=1 and n=0 hold.

(Item 1-68)

The optical pickup device described in Item 1-65 wherein k=3, m=2 and n=2 hold.

(Item 1-69)

The optical pickup device described in Item 1-64 wherein k=5, m=3 and n=2 hold.

(Item 1-70)

The optical pickup device described in Item 1-65 wherein k=5, m=3 and n=3 hold.

(Item 1-71)

The optical pickup device described in Item 1-65 wherein k=7, m=4 and n=4 hold.

Item 2-1

To solve the aforementioned problems, the invention described in Item 2-1 is an optical pickup device to conduct reproducing and/or recording of information by using a light flux emitted from the first light source with wavelength $\lambda 1$ on the first optical information recording medium having protective substrate thickness t1, to conduct reproducing and/or recording of information by using a light flux emitted from the second light source with wavelength $\lambda 2$ ($\lambda 1 < \lambda 2$) on the second optical information recording medium having protective substrate thickness t2 (t1≦t2), and to conduct reproducing and/or recording of information by using a light flux emitted from the third light source with wavelength $\lambda 3$ ($\lambda 2 < \lambda 3$) on the third optical information recording medium having protective substrate thickness t3 (t2≦t3), wherein the optical pickup device is arranged on the common optical path for the first, second and third light sources, and is equipped with a diffractive optical element having the first diffractive structure, and is structured so that all light fluxes are made to enter the diffracting light optical element included in the optical pickup device at the substantially same angle, a converged-light spot of the $m^{th}$ (m represents a natural number) order diffracted light is formed by the diffractive optical element on the first optical information recording medium and a converged-light spot of the $n^{th}$ (n represents a natural number satisfying n≠m) order diffracted light is formed by the diffractive optical element on the second optical information recording medium, when conducting reproducing and/or recording of information for the first, second and third optical information recording media.

In the invention described in Item 2-1, the optical pickup device is arranged on the common optical path for the first, second and third light sources, and a diffractive optical element having the first diffractive structure is provided, and when conducting reproducing and/or recording of information for the first, second and third optical information recording media, all light fluxes are made to enter the diffracting light optical element at the substantially same angle.

Therefore, the optical paths for light respectively with the first-third wavelengths are mostly the same, thus, various types of optical elements constituting the optical pickup device have only to be arranged to correspond to the common optical path, thereby, the structure of the optical pickup device can be simplified and the number of parts of the device can be reduced.

Item 2-2

The invention described in Item 2-2 is the optical pickup device according to Item 2-1, wherein the diffractive optical element is an objective optical element.

Item 2-3

The invention described in Item 2-3 is the optical pickup device according to Item 2-2, wherein all the light fluxes stated above are made to enter the diffractive optical element as substantially infinite parallel rays.

In the invention described in Item 2-3, the same effect as in Item 2-2 can be obtained and all the light fluxes are made to enter the diffractive optical element as substantially infinite parallel rays.

Therefore, it is possible to prevent that image height characteristics are worsened in the case of tracking to move an objective optical element for the optical information recording medium, and to inhibit occurrence of various aberrations such as coma and astigmatism.

It is further possible to inhibit spherical aberration caused by temperature changes.

Item 2-4

The invention described in Item 2-4 is the optical pickup device according to either one of Item 2-s 1-3 wherein the diffractive optical element functions as a collimator when the light flux having wavelength λ1 enters.

Item 2-5

The invention described in Item 2-5 is the optical pickup device according to either one of Items 2-1-3 wherein the diffractive optical element functions as a collimator when the light flux having wavelength λ2 enters.

Item 2-6

The invention described in Item 2-6 is the optical pickup device according to Item 2-1, wherein the diffractive optical element mentioned above is an optical element provided separately from the objective optical element and the collimator which constitute the optical pickup device.

Item 2-7

The invention described in Item 2-7 is an optical pickup device to conduct reproducing and/or recording of information by using a light flux emitted from the first light source with wavelength λ1 on the first optical information recording medium having protective substrate thickness t1, to conduct reproducing and/or recording of information by using a light flux emitted from the second light source with wavelength λ2 (λ1<λ2) on the second optical information recording medium having protective substrate thickness t2 (t1<t2), and to conduct reproducing and/or recording of information by using a light flux emitted from the third light source with wavelength λ3 (λ2<λ3) on the third optical information recording medium having protective substrate thickness t3 (t2≦t3), wherein the optical pickup device is equipped with a first compatible optical element that is arranged in a common optical path for the first, second and third light sources and with a second compatible optical element that is arranged in an optical path for only one of the first, second and third light sources, or in a common optical path for some two light sources, and the first compatible optical element has a first compatible function to form a converged-light spot necessary for conducting reproducing and/or recording of information for at least one of the first, second and third optical information recording media, while the second compatible optical element has a second compatible function, when it is combined with the first compatible optical element, to form a converged-light spot necessary for conducting reproducing and/or recording of information for the other optical information recording medium among the first, second and third optical information recording media, and the optical pickup device is arranged on the common optical path for the first, second and third light sources, and is equipped with a diffractive optical element having the first diffractive structure, and a plurality of ring-shaped zonal optical surfaces with an optical axis as the center are formed on at least one optical surface of at least one optical element among the first compatible optical element, the second compatible optical element and the diffractive optical element, and the ring-shaped zonal optical surfaces are formed continuously through stepped surfaces, thus, a converged-light spot of the $m^{th}$ (m represents a natural number) order diffracted light is formed by the diffractive optical element on the first optical information recording medium and a converged-light spot of the $n^{th}$ (n represents a natural number satisfying n≠m) order diffracted light is formed by the diffractive optical element on the second optical information recording medium.

Item 2-8

The invention described in Item 2-8 is the optical pickup device according to Item 2-7, wherein the first compatible optical element is an objective optical element.

Item 2-9

The invention described in Item 2-9 is the optical pickup device according to Item 2-7 or Item 2-8 wherein the second compatible optical element is a phase difference plate.

Item 2-10

The invention described in Item 2-10 is the optical pickup device according to Item 2-7 or Item 2-8 wherein the second compatible optical element is a liquid crystal element.

Item 2-11

The invention described in Item 2-11 is the optical pickup device according to Item 2-7 or Item 2-8 wherein the second compatible optical element is a diffractive optical element.

Item 2-12

The invention described in Item 2-12 is the optical pickup device according to either one of Item 2-7-2-11, wherein the light-converging optical system that is composed of the first compatible optical element, the second compatible optical element, the diffractive optical element and the objective optical element constituting the optical pickup device, has an optical system magnification that is substantially the same for light fluxes having respectively the wavelengths λ1, λ2 and λ3, and the first compatible function and the second compatible function correct spherical aberrations caused by a wavelength difference and by a difference of a protective substrate thickness between optical information recording media.

Item 2-13

The invention described in Item 2-13 is the optical pickup device according to Item 2-12, wherein the optical system magnification is substantially zero.

Item 2-14

The invention described in Item 2-14 is the optical pickup device according to either one of Items 2-7-2-11, wherein the light-converging optical system that is composed of the first compatible optical element, the second compatible optical element, the diffractive optical element and the objective optical element constituting the optical pickup device, has optical system magnifications which are different for light fluxes having respectively the wavelengths λ1, λ2 and λ3, and the first compatible function and the second compatible function correct spherical aberrations caused by a wavelength difference, a difference of a protective substrate thickness between optical information recording media and by a difference in optical system magnifications of the light-converging optical system.

Item 2-15

The invention described in Item 2-15 is the optical pickup device according to either one of Items 2-1-2-14, wherein there is provided an optical correcting element for conducting temperature compensation and/or chromatic aberration compensation for at least one converged-light spot among converged-light spots formed on the first, second and third optical information recording media.

Item 2-16

The invention described in Item 2-16 is the optical pickup device according to Item 2-1 or Item 2-7, wherein NA3<NA1 and NA3<NA2 are satisfied when NA1 represents a numerical aperture of a converged-light spot formed on the first optical information recording medium by the light flux having wavelength λ1, NA2 represents a numerical aperture of a converged-light spot formed on the second optical information recording medium by the light flux having wavelength λ2, and NA3 represents a numerical aperture of a converged-light spot formed on the third optical information recording medium by the light flux having wavelength λ3.

Item 2-17

The invention described in Item 2-17 is the optical pickup device according to Item 2-16, wherein a plurality of ring-shaped zonal optical surfaces are represented by at least one optical surface of at least one optical element among the first compatible optical element, the second compatible optical element and the diffractive optical element, and when a light flux with wavelength λ3 that forms a converged-light spot having numerical aperture NA3 on the third optical information recording medium is formed at an area through which the light flux passes, and when Rs represents the ring-shaped zonal optical surface including an optical axis among the plural ring-shaped zonal optical surfaces, and R1 represents the ring-shaped zonal optical surface which is farthest from the optical axis, light fluxes having respectively wavelengths λ1, λ2 and λ3 which have passed through the ring-shaped zonal optical surfaces Rs are used for reproducing and/or recording for respective optical information recording media, while, a light flux with wavelength λ3 that has passed through the ring-shaped zonal optical surface R1 is used for reproducing and/or recording for the third optical information recording medium.

Item 2-18

The invention described in Item 2-18 is the optical pickup device according to Item 2-17, wherein the first diffractive structure is formed on the area which is at least one optical surface of the diffractive optical element and through which the light flux with the wavelength λ3 which forms a light-converted spot with numerical aperture NA3 on the third optical information recording medium, and a converged-light spot is formed on the third optical information recording medium by $k^{th}$ (k is a natural number) order diffracted light the light flux with wavelength λ3 generated by the first diffractive structure, satisfying k=m/2, 370 nm≦λ1≦430 nm and 760 nm≦λ3≦810 nm.

Item 2-19

The invention described in Item 2-19 is the optical pickup device according to Item 2-17 or Item 2-18, wherein each of light fluxes having respectively wavelengths λ1 and λ2 which have passed through the ring-shaped zonal optical surface Rs is converged on an information recording surface of each optical information recording medium, to be substantially free from any aberrations.

Item 2-20

The invention described in Item 2-20 is the optical pickup device according to Item 2-18 or Item 2-19, wherein the ring-shaped zonal optical surface and the first diffractive structure are formed on the same surface of the diffractive optical element.

Item 2-21

The invention described in Item 2-21 is the optical pickup device according to either one of Items 2-17-2-20, wherein both of the diffraction efficiency of the $m^{th}$ order diffracted light and that of the $n^{th}$ order diffracted light are 80% or more.

Item 2-22

The invention described in Item 2-22 is the optical pickup device according to either one of Items 2-17-2-21, wherein the diffraction efficiency of the $k^{th}$ order diffracted light is 50% or more.

Item 2-23

The invention described in Item 2-23 is the optical pickup device according to either one of Items 2-17-2-22, wherein a wave-front aberration of the converged-light spot formed on the third optical information recording medium by the light flux with wavelength λ3 is 0.040 (λ3 rms) or less.

Item 2-24

The invention described in Item 2-24 is the optical pickup device according to either one of Items 2-17-2-23, wherein paraxial rays of the light flux with wavelength λ3 are converged on a point which is closer to the light source than the position in the direction of an optical axis which makes a wave-front aberration of the converged-light spot formed on the third optical information recording medium by the light flux with wavelength λ3 to be minimum.

Item 2-25

The invention described in Item 2-25 is the optical pickup device according to either one of Items 2-17-24, wherein the light fluxes having respectively wavelengths λ1 and λ2 enter the diffractive optical element at the same angle of divergence, or enter as the same infinite light, and the first diffractive structure makes the diffraction effect by a difference between the wavelengths λ1 and λ2 to correct spherical aberration caused by a difference between the wavelengths λ1 and λ2 and by refraction function of the optical surface on which the first diffractive structure is provided and spherical aberration caused by a difference between protective substrate thickness t1 and t2.

Item 2-26

The invention described in Item 2-26 is the optical pickup device according to either one of Items 2-17-25, wherein m=8 and n=5 are satisfied.

Item 2-27

The invention described in Item 2-27 is the optical pickup device according to either one of Items 2-17-25, wherein m=6 and n=4 are satisfied.

Item 2-28

The invention described in Item 2-28 is the optical pickup device according to either one of Items 2-17-2-25, wherein m=2 and n=1 are satisfied.

Item 2-29

The invention described in Item 2-29 is the optical pickup device according to either one of Items 2-17-28, wherein 1.9×λ1≦λ3≦2.1×λ1 is satisfied.

Item 2-30

The invention described in Item 2-30 is the optical pickup device according to either one of Items 2-18-2-29, wherein the light flux with wavelength λ3 which has passed the ring-shaped optical surface Rs and the light flux with wavelength λ3 which has passed the ring-shaped optical surface R1 are converged to be away each other by 10 nm or more in the direction of an optical axis.

Item 2-31

The invention described in Item 2-31 is the optical pickup device according to Item 2-30, wherein $-0.1\pi \leqq \phi \leqq 0.1\pi$ is satisfied by phase difference $\phi$ at the converged-light spots for the light flux with wavelength $\lambda 3$ which has passed through the ring-shaped optical surface Rs and the light flux with wavelength $\lambda 3$ which has passed through the ring-shaped optical surface other than the ring-shaped optical surface Rs.

Item 2-32

The invention described in Item 2-32 is the optical pickup device according to Item 2-30 or Item 2-31, wherein a phase difference concerning the light flux with wavelength $\lambda 3$ is varied before and after the light flux passes through the adjoining ring-shaped zonal optical surfaces.

Item 2-33

The invention described in Item 2-33 is the optical pickup device according to either one of Items 2-30-2-32, wherein the phase difference of at least one of the light fluxes respectively with wavelengths $\lambda 1$ and $\lambda 2$ is not varied before and after the light flux passes through the adjoining ring-shaped zonal optical surfaces.

Item 2-34

The invention described in Item 2-34 is the optical pickup device according to either one of Items 2-30-2-33, wherein the number of the ring-shaped zonal optical surfaces is any number within a range from 2 to 10.

Item 2-35

The invention described in Item 2-35 is the optical pickup device according to either one of Items 2-18-2-29, wherein the first diffractive structure is formed on an area through which the light fluxes having respectively wavelengths $\lambda 1, \lambda 2$ and $\lambda 3$ which form converged-light spots on respective optical information recording media after passing through the ring-shaped zonal optical surface Rs pass, and light-converging position fB3 of the light flux with wavelength $\lambda 3$ that forms a converged-light spot after passing through the ring-shaped zonal optical surface R1 satisfies $|fB3| \leqq 5$ μm in the direction of an optical axis for the best image surface for the converged-light spot that is formed by the light flux with wavelength $\lambda 3$ on the third optical information recording medium.

Item 2-36

The invention described in Item 2-36 is the optical pickup device according to Item 2-35, wherein an area on the optical surface on which the first diffractive structure is formed through which the light fluxes having respectively wavelengths $\lambda 1, \lambda 2$ and $\lambda 3$ which form converged-light spots respectively on optical information recording media after passing through the ring-shaped zonal optical surface R1 pass is a refracting interface.

Item 2-37

The invention described in Item 2-37 is the optical pickup device according to Item 2-35, wherein the second diffractive structure is formed on an area on the optical surface on which the first diffractive structure is formed through which the light fluxes having respectively wavelengths $\lambda 1, \lambda 2$ and $\lambda 3$ which form converged-light spots respectively on optical information recording media after passing through the ring-shaped zonal optical surface R1 pass.

Item 2-38

The invention described in Item 2-38 is the optical pickup device according to Item 2-37, wherein a combination of diffracted light that generates the maximum diffraction efficiency among diffracted light of respective light fluxes generated by the first diffractive structure when light fluxes having respectively wavelengths $\lambda 1, \lambda 2$ and $\lambda 3$ enter is different from a combination of diffracted light that generates the maximum diffraction efficiency among diffracted light of respective light fluxes generated by the second diffractive structure.

Item 2-39

The invention described in Item 2-39 is the optical pickup device according to Item 2-38, wherein a combination of diffracted light that generates the maximum diffraction efficiency among diffracted light of respective light fluxes generated by the second diffractive structure when light fluxes having respectively wavelengths $\lambda 1, \lambda 2$ and $\lambda 3$ enter is a combination of 1, 1 and 1.

Item 2-40

The invention described in Item 2-40 is the optical pickup device according to either one of Items 2-35-2-39, wherein the light flux with wavelength $\lambda 1$ which has passed through ring-shaped zonal optical surface R1 is converged on an information recording surface of the first optical information recording medium, to be substantially free from any aberrations.

Item 2-41

The invention described in Item 2-41 is the optical pickup device according to either one of Items 2-35-2-40, wherein the light flux with wavelength $\lambda 2$ which has passed through ring-shaped zonal optical surface R1 is converged on an information recording surface of the second optical information recording medium, to be substantially free from any aberrations.

Item 2-42

The invention described in Item 2-42 is the optical pickup device according to either one of Items 2-35-2-41, wherein a length in the direction that is in parallel with an optical axis of the stepped surface closer to the optical axis among two stepped surfaces following the ring-shaped zonal optical surface R1 is shorter than a length in the direction that is in parallel with an optical axis of the other stepped surface.

Item 2-43

The invention described in Item 2-43 is the optical pickup device according to either one of Item 2-35-2-42, wherein the number of the ring-shaped zonal optical surfaces is two.

Item 2-44

The invention described in Item 2-44 represents a plurality of optical elements included in an optical pickup device to conduct reproducing and/or recording of information by using a light flux emitted from the first light source with wavelength $\lambda 1$ on the first optical information recording medium having protective substrate thickness t1, to conduct reproducing and/or recording of information by using a light flux emitted from the second light source with wavelength $\lambda 2$ ($\lambda 1 < \lambda 2$) on the first optical information recording medium having protective substrate thickness t2 (t1$\leqq$t2), and to conduct reproducing and/or recording of information by using a light flux emitted from the second light source with wavelength $\lambda 3$ ($\lambda 2 < \lambda 3$) on the first optical information recording medium having protective substrate thickness t3 (t2$\leqq$t3), wherein the optical pickup device is arranged on the common optical path for the first, second and third light sources, and it includes a diffractive optical element having the first diffractive structure, and is structured so that all light fluxes are made to enter the diffracting light optical element included in the optical pickup device at the substantially same angle, a converged-light spot of the $m^{th}$ (m represents a natural number) order diffracted light is formed by the diffractive optical element on the first optical information recording medium and a converged-light spot of the $n^{th}$ (n represents a natural number satisfying n≠m) order diffracted light is formed by the diffractive optical element on the second optical information recording medium, when conducting reproducing and/or recording of information for the first, second and third optical information recording media.

Item 2-45

The invention described in Item 2-45 is the optical element according to Item 2-44, wherein the diffractive optical element is an objective optical element.

Item 2-46

The invention described in Item 2-46 is the optical element according to Item 2-45, wherein all the light fluxes stated above are made to enter the diffractive optical element as substantially infinite parallel rays.

Item 2-47

The invention described in Item 2-47 is the optical element according to either one of Item 2-44-2-46, wherein the diffractive optical element functions as a collimator when the light flux having wavelength λ1 enters.

Item 2-48

The invention described in Item 2-48 is the optical element according to either one of Items 2-44-2-46, wherein the diffractive optical element functions as a collimator when the light flux having wavelength λ2 enters.

Item 2-49

The invention described in Item 2-49 is the optical element according to Item 2-44, wherein the diffractive optical element is provided separately from an objective optical element and a collimator which constitute an optical pickup device.

Item 2-50

The invention described in Item 2-50 represents a plurality of optical elements included in an optical pickup device to conduct reproducing and/or recording of information by using a light flux emitted from the first light source with wavelength λ1 on the first optical information recording medium having protective substrate thickness t1, to conduct reproducing and/or recording of information by using a light flux emitted from the second light source with wavelength λ2 (λ1<λ2) on the first optical information recording medium having protective substrate thickness t2 (t1≦t2), and to conduct reproducing and/or recording of information by using a light flux emitted from the second light source with wavelength λ3 (λ2<λ3) on the first optical information recording medium having protective substrate thickness t3 (t2≦t3), wherein the first compatible optical element arranged on a common optical path of the first, second and third light sources and the second compatible optical element arranged on an optical path of only one of the first, second and third light sources or on a common optical path of any two light sources of them are included, and the first compatible optical element has the first compatible function for forming a converged-light spot necessary for conducting reproducing and/or recording of information for at least one of the first, second and third optical information recording media, while, the second compatible optical element has, in combination with the first compatible optical element, the second compatible function for forming a converged-light spot necessary for conducting reproducing and/or recording of information for the other optical information recording medium among the first, second and third optical information recording media, and is arranged on the common optical path for the first, second and third light sources to include a diffractive optical element having the first diffractive structure, and they are structured so that a plurality of ring-shaped zonal optical surfaces with an optical axis as the center are formed on at least one optical surface of at least one optical element among the first and second compatible optical elements and the diffractive optical element, the plural ring-shaped zonal optical surfaces are formed continuously through stepped surfaces, a converged-light spot caused by $m^{th}$ (m represents a natural number) diffracted light generated by the diffractive optical element on the first optical information recording medium and a converged-light spot caused by $n^{th}$ (n represents a natural number satisfying n≠m) diffracted light generated by the diffractive optical element on the second optical information recording medium.

Item 2-51

The invention described in Item 2-51 is the optical element according to Item 2-50, wherein the first compatible optical element is an objective optical element.

Item 2-52

The invention described in Item 2-52 is the optical element according to Item 2-50 or Item 2-51, wherein the second compatible optical element is a phase difference plate.

Item 2-53

The invention described in Item 2-53 is the optical element according to Item 2-50 or Item 2-51, wherein the second compatible optical element is a liquid crystal element.

Item 2-54

The invention described in Item 2-53 is the optical element according to Item 2-50 or Item 2-51, wherein the second compatible optical element is a diffractive optical element.

Item 2-55

The invention described in Item 2-53 is the optical element according to either one of Items 2-50-2-54, wherein a light-converging optical system composed of the first compatible optical element, the second compatible optical element, the diffractive optical element an objective optical element that constitutes an optical pickup device has an optical system magnification which is substantially the same for the light fluxes having respectively wavelengths λ, λ2 and λ3, and the first and second compatible functions correct spherical aberration caused by a wavelength difference and that caused by a difference of protective substrate thickness between optical information recording media.

Item 2-56

The invention described in Item 2-56 is the optical element according to Item 2-55, wherein the optical system magnification is substantially zero.

Item 2-57

The invention described in Item 2-57 is the optical element according to either one of Items 2-50-2-54, wherein a light-converging optical system composed of the first compatible optical element, the second compatible optical element, the diffractive optical element an objective optical element that constitutes an optical pickup device has an optical system magnifications which are different for the light fluxes having respectively wavelengths λ1, λ2 and λ3, and the first and second compatible functions correct spherical aberration caused by a wavelength difference, spherical aberration caused by a difference of protective substrate thickness between optical information recording media and spherical aberration caused by a difference between optical system magnifications of the light-converging optical system.

Item 2-58

The invention described in Item 2-58 is the optical element according to either one of Items 2-43-2-57, wherein there is provided an optical correcting element for conducting temperature compensation and/or chromatic aberration compensation for at least one of converged-light spots formed respectively on the first, second and third optical information recording media.

Item 2-59

The invention described in Item 2-58 is the optical element according to Item 2-44 or Item 2-50, wherein NA3<NA1 and NA3<NA1 are satisfied when NA1 represents a numerical aperture of a converged-light spot formed by the light flux with wavelength $\lambda 1$ on the first optical information recording medium, NA2 represents a numerical aperture of a converged-light spot formed by the light flux with wavelength $\lambda 2$ on the second optical information recording medium and NA3 represents a numerical aperture of a converged-light spot formed by the light flux with wavelength $\lambda 3$ on the third optical information recording medium.

Item 2-60

The invention described in Item 2-60 is the optical element according to Item 2-59, wherein a plurality of ring-shaped zonal optical surfaces are represented by at least one optical surface of at least one optical-element among the first compatible optical element, the second compatible optical element and the diffractive optical element, and when a light flux with wavelength $\lambda 3$ that forms a converged-light spot having numerical aperture NA3 on the third optical information recording medium is formed at an area through which the light flux passes, and when Rs represents the ring-shaped zonal optical surface including an optical axis among the plural ring-shaped zonal optical surfaces, and R1 represents the ring-shaped zonal optical surface which is farthest from the optical axis, light fluxes having respectively wavelengths $\lambda 1$, $\lambda 2$ and $\lambda 3$ which have passed through the ring-shaped zonal optical surfaces Rs are used for reproducing and/or recording for respective optical information recording media, while, a light flux with wavelength $\lambda 3$ that has passed through the ring-shaped zonal optical surface R1 is used for reproducing and/or recording for the third optical information recording medium.

Item 2-61

The invention described in Item 2-61 is the optical element according to Item 2-60, wherein the first diffractive structure is formed on the area which is at least one optical surface of the diffractive optical element and through which the light flux with the wavelength $\lambda 3$ which forms a light-converted spot with numerical aperture NA3 on the third optical information recording medium, and a converged-light spot is formed on the third optical information recording medium by $k^{th}$ (k is a natural number) order diffracted light the light flux with wavelength $\lambda 3$ generated by the first diffractive structure, satisfying k=m/2, 370 nm$\leq \lambda 1 \leq$430 nm and 760 nm$\leq \lambda 3 \leq$810 nm.

Item 2-62

The invention described in Item 2-62 is the optical element according to Item 2-60 or Item 2-61, wherein each of light fluxes having respectively wavelengths $\lambda 1$ and $\lambda 2$ which have passed through the ring-shaped zonal optical surface Rs is converged on an information recording surface of each optical information recording medium, to be substantially free from any aberrations.

Item 2-63

The invention described in Item 2-20 is the optical element according to Item 2-61 or Item 2-62, wherein the ring-shaped zonal optical surface and the first diffractive structure are formed on the same surface of the diffractive optical element.

Item 2-64

The invention described in Item 2-64 is the optical element according to either one of Items 2-60-2-63, wherein both of the diffraction efficiency of the $m^{th}$ order diffracted light and that of the $n^{th}$ order diffracted light are 80% or more.

Item 2-65

The invention described in Item 2-65 is the optical element according to either one of Items 2-60-2-64, wherein the diffraction efficiency of the $k^{th}$ order diffracted light is 50% or more.

Item 2-66

The invention described in Item 2-66 is the optical element according to either one of Items 2-60-2-65, wherein a wave-front aberration of the converged-light spot formed on the third optical information recording medium by the light flux with wavelength $\lambda 3$ is 0.040 ($\lambda 3$ rms) or less.

Item 2-67

The invention described in Item 2-67 is the optical element according to either one of Items 2-60-2-66, wherein paraxial rays of the light flux with wavelength $\lambda 3$ are converged on a point which is closer to the light source than the position in the direction of an optical axis which makes a wave-front aberration of the converged-light spot formed on the third optical information recording medium by the light flux with wavelength $\lambda 3$ to be minimum.

Item 2-68

The invention described in Item 2-68 is the optical element according to either one of Items 2-60-2-67, wherein the light fluxes having respectively wavelengths $\lambda 1$ and $\lambda 2$ enter the diffractive optical element at the same angle of divergence, or enter as the same infinite light, and the first diffractive structure makes the diffraction effect by a difference between the wavelengths $\lambda 1$ and $\lambda 2$ to correct spherical aberration caused by a difference between the wavelengths $\lambda 1$ and $\lambda 2$ and by refraction function of the optical surface on which the first diffractive structure is provided and spherical aberration caused by a difference between protective substrate thickness t1 and t2.

Item 2-69

The invention described in Item 2-69 is the optical element according to either one of Items 2-60-2-68, wherein m=8 and n=5 are satisfied.

Item 2-70

The invention described in Item 2-70 is the optical element according to either one of Items 2-60-2-68, wherein m=6 and n=4 are satisfied.

Item 2-71

The invention described in Item 2-71 is the optical element according to either one of Items 2-60-2-68, wherein m=2 and n=1 are satisfied.

Item 2-72

The invention described in Item 2-72 is the optical element according to either one of Items 2-60-2-71, wherein $1.9\times \lambda 1 \leq \lambda 3 \leq 2.1 \times \lambda 1$ is satisfied.

Item 2-73

The invention-described in Item 2-73 is the optical element according to either one of Items 2-61-2-72, wherein the light flux with wavelength λ3 which has passed the ring-shaped optical surface Rs and the light flux with wavelength λ3 which has passed the ring-shaped optical surface R1 are converged to be away each other by 10 nm or more in the direction of an optical axis.

Item 2-74

The invention described in Item 2-74 is the optical element according to Item 2-73, wherein $-0.1\pi \leq \phi \leq 0.1\pi$ is satisfied by phase difference φ at the converged-light spots for the light flux with wavelength λ3 which has passed through the ring-shaped optical surface Rs and the light flux with wavelength λ3 which has passed through the ring-shaped optical surface other than the ring-shaped optical surface Rs.

Item 2-75

The invention described in Item 2-75 is the optical element according to Item 2-73 or Item 2-74, wherein a phase difference concerning the light flux with wavelength λ3 is varied before and after the light flux passes through the adjoining ring-shaped zonal optical surfaces.

Item 2-76

The invention described in Item 2-76 is the optical element according to either one of Items 2-73-2-75, wherein the phase difference of at least one of the light fluxes respectively with wavelengths λ1 and λ2 is not varied before and after the light flux passes through the adjoining ring-shaped zonal optical surfaces.

Item 2-77

The invention described in Item 2-77 is the optical element according to either one of Items 2-73-2-76, wherein the number of the ring-shaped zonal optical surfaces is any number within a range from 2 to 10.

Item 2-78

The invention described in Item 2-78 is the optical element according to either one of Items 2-61-2-72, wherein the first diffractive structure is formed on an area through which the light fluxes having respectively wavelengths λ1, λ2 and λ3 which form converged-light spots on respective optical information recording media after passing through the ring-shaped zonal optical surface Rs pass, and light-converging position fB3 of the light flux with wavelength λ3 that forms a converged-light spot after passing through the ring-shaped zonal optical surface R1 satisfies |fB3|≦5 μm in the direction of an optical axis for the best image surface for the converged-light spot that is formed by the light flux with wavelength λ3 on the third optical information recording medium.

Item 2-79

The invention described in Item 2-79 is the optical element according to Item 2-78, wherein an area on the optical surface on which the first diffractive structure is formed through which the light fluxes having respectively wavelengths λ1, λ2 and λ3 which form converged-light spots respectively on optical information recording media after passing through the ring-shaped zonal optical surface R1 pass is a refracting interface.

Item 2-80

The invention described in Item 2-80 is the optical element according to Item 2-78, wherein the second diffractive structure is formed on an area on the optical surface on which the first diffractive structure is formed through which the light fluxes having respectively wavelengths λ1, λ2 and λ3 which form converged-light spots respectively on optical information recording media after passing through the ring-shaped zonal optical surface R1 pass.

Item 2-81

The invention described in Item 2-81 is the optical element according to Item 2-80, wherein a combination of diffracted light that generates the maximum diffraction efficiency among diffracted light of respective light fluxes generated by the first diffractive structure when light fluxes having respectively wavelengths λ1, λ2 and λ3 enter is different from a combination of diffracted light that generates the maximum diffraction efficiency among diffracted light of respective light fluxes generated by the second diffractive structure.

Item 2-82

The invention described in Item 2-82 is the optical pickup device according to Item 2-81, wherein a combination of diffracted light that generates the maximum diffraction efficiency among diffracted light of respective light fluxes generated by the second diffractive structure when light fluxes having respectively wavelengths λ1, λ2 and λ3 enter is a combination of 1, 1 and 1.

Item 2-83

The invention described in Item 2-83 is the optical element according to either one of Items 2-78-2-82, wherein the light flux with wavelength λ1 which has passed through ring-shaped zonal optical surface R1 is converged on an information recording surface of the first optical information recording medium, to be substantially free from any aberrations.

Item 2-84

The invention described in Item 2-84 is the optical element according to either one of Items 2-78-2-83, wherein the light flux with wavelength λ2 which has passed through ring-shaped zonal optical surface R1 is converged on an information recording surface of the second optical information recording medium, to be substantially free from any aberrations.

Item 2-85

The invention described in Item 2-42 is the optical element according to either one of Items 2-78-2-84, wherein a length in the direction that is in parallel with an optical axis of the stepped surface closer to the optical axis among two stepped surfaces following the ring-shaped zonal optical surface R1 is shorter than a length in the direction that is in parallel with an optical axis of the other stepped surface.

Item 2-86

The invention described in Item 2-86 is the optical element according to either one of Items 2-78-2-85, wherein the number of the ring-shaped zonal optical surfaces is two.

BRIEF DESCRIPTION OF THE DRAWINGS

FIG. 16 is a diagram showing wave-front aberration and diffraction efficiency in Example 1.

FIG. 21 is a diagram showing wave-front aberration and diffraction efficiency in Example 2.

DETAILED DESCRIPTION OF THE PREFERRED EMBODIMENT

Figure 1:
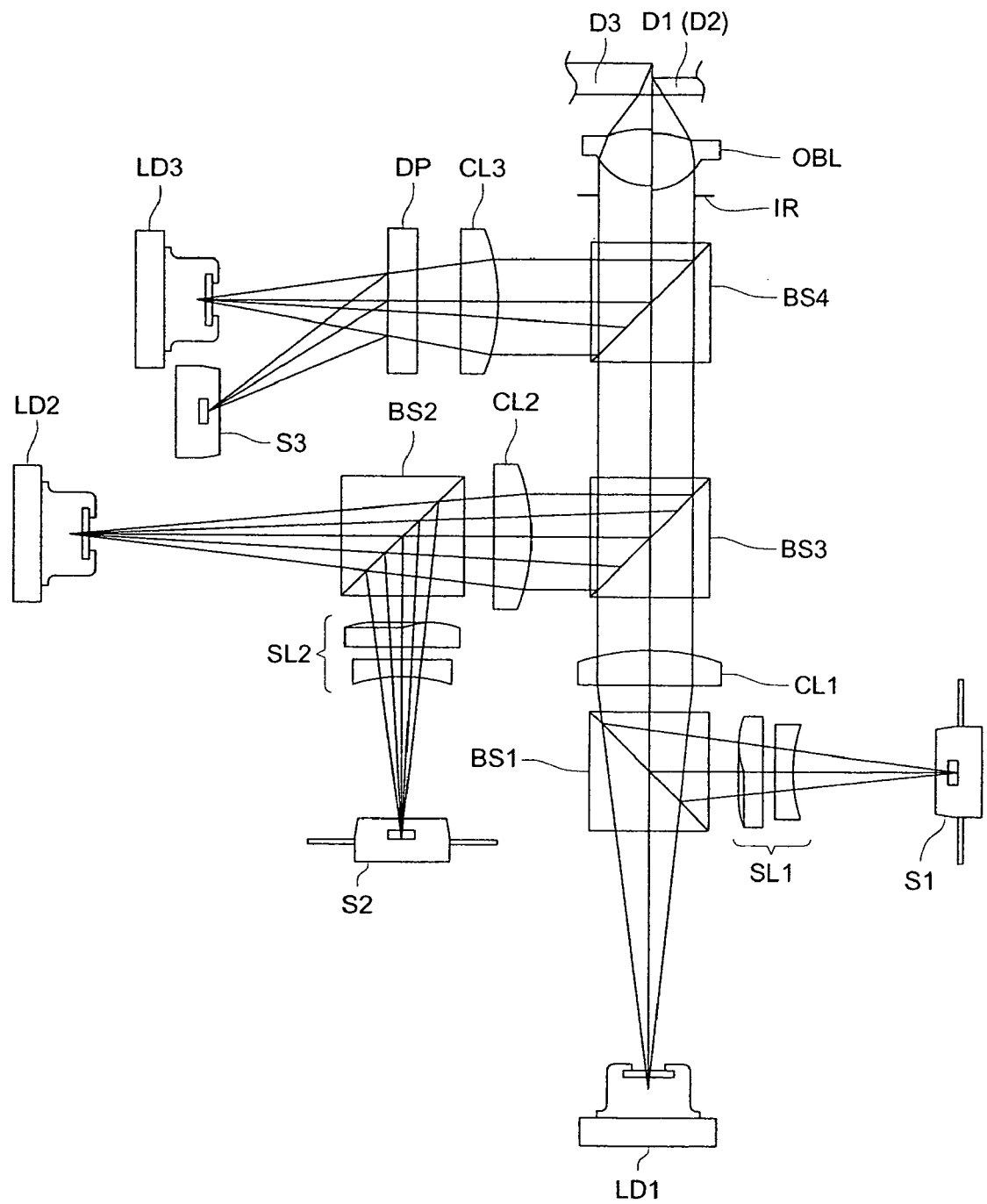
FIG. 1 is a diagram of an optical pickup device relating to the invention.

Referring to the drawings, there will be explained in detail as follows the contents of the invention, to which, however, embodiments of the invention are not limited.

First Embodiment

The invention described in Item 1-1 will be explained as follows, referring to FIG. 1.

In the present example, a "high density optical disc" employing the so-called violet laser having a working wavelength of 405 nm is aimed, and there are imagined "high density optical disc" whose protective substrate thickness t1 is 0.6 mm, DVD whose protective substrate thickness t2 is 0.6 mm and CD whose protective substrate thickness t3 is 1.2 mm, respectively as the first optical information recording medium, the second optical information recording medium and the third optical information recording medium.

FIG. 1 is a schematic diagram showing an optical pickup device relating to the invention.

Laser diode LD1 is a first light source in which a violet laser whose wavelength $\lambda_1$ is 405 nm is used, and lasers within a range of 390 nm-420 nm in terms of wavelength can be employed according to circumstances. LD2 is a second light source in which a red laser whose wavelength $\lambda_2$ is 655 nm is used, and lasers within a range of 630 nm-680 nm in terms of wavelength can be employed according to circumstances. LD3 is a third light source in which an infrared laser whose wavelength $\lambda_3$ is 780 nm is used, and lasers within a range of 750 nm-800 nm in terms of wavelength can be employed according to circumstances.

Beam splitter BS1 transmits a beam emitted from LD1 toward OBL representing an objective optical element and also has a function to make reflected light (returning light) coming from an optical disc (a first optical information recording medium) to pass through sensor lens group SL1 to be converged on light-receiving sensor S1. The function of BS2 is the same as the foregoing.

BS3 is arranged for the purpose of putting a light flux coming from LD1 and a light flux coming from LD2 on the same optical path. BS4 is arranged for the purpose of putting a light flux coming from LD3 and a light flux coming from BS3 on the same optical path.

A light flux emitted from LD1 passes through BS1 and enters collimator CL1 where the light flux is collimated into the infinite parallel light, and then, passes through BS3 and BS4 to enter objective lens OBL representing an objective optical element. Then, it forms a converged-light spot on an information recording surface through a protective substrate of the first optical information recording medium. After being reflected on the information recording surface, it takes the same path to pass through collimator CL1 and is deflected by BS1 to pass through lens sensor LS1 to be converged on sensor S1 to be converted photoelectrically into electric signals.

A light flux emitted from LD2 also forms a converged-light spot on an optical disc (a second optical information recording medium) and is reflected to be converged finally on sensor S2. Incidentally, the foregoing also applies to a light flux emitted from LD3, but in this case, diffracting plate DP is provided in place of a beam splitter so that return light may be converged on sensor S3. When conducting reproducing of information from CD, the above-mentioned structure can be used because an amount of received light can be less compared with DVD and "high density optical disc".

Though objective optical element OBL is a single lens in this diagram, it may also be composed of a plurality of optical elements in case of need. Its material may be either plastic resin or glass.

How a light flux emitted from LD 1 and a light flux emitted from LD 2 are converged on an information recording surface through respectively protective base plates respectively of optical discs D1 and D2 are drawn on the left side of the optical axis, and how a light flux emitted from LD3 is converged on an information recording surface through a protective substrate of optical disc D3 is drawn on the right side of the optical axis of OBL. In this way, the basic position is switched by an unillustrated actuator depending on an optical disc to be reproduced and/or recorded, and focusing is conducted from its standard position.

A numerical aperture required on objective optical element OBL varies depending on a thickness of a protective substrate of each optical information recording medium and on a size of a pit. In this case, the numerical aperture for CD is 0.45, and that for DVD and a "high density optical disc" is 0.65. However, it is possible to select the numerical aperture within a range of 0.43-0.50 for CD and of 0.58-0.68 for DVD according to circumstances.

Incidentally, IR represents a diaphragm to cut unwanted light.

In the present example, objective optical element OBL is made to have the role of "a diffractive optical element that is arranged in a common optical path for the first, second and third light sources and has a diffractive structure". Therefore, a serrated diffractive structure is provided on the objective optical element.

A pitch of the serration (diffracting power) and its depth (a blazed wavelength) are established so that a light flux coming from the first light source is formed as a converged-light spot by the second order diffracted light for a "high density optical disc", and a light flux coming from the second light source is formed as a converged-light spot by the first order diffracted light for DVD.

By using light each having a different diffraction order number, it is possible to enhance diffraction efficiency in each occasion and to secure an amount of light.

For CD, it is preferable to make a light flux from the third light source to be the diffracted light having the order number equivalent to that for DVD, but the other order number may also be used according to circumstances. In the present example, a converged-light spot is formed as diffracted light having the first order number equivalent to that for DVD.

Though there has been explained an example wherein a diffractive structure is provided on an objective optical element as a diffractive optical element in the present example, it is also possible to provide a diffractive structure generating such diffracted light with different order number on a collimator, or to provide another optical element in an optical path.

Further, for switching of openings, it is possible to apply known technologies including a diffractive optical element.

Incidentally, though there has been explained reproducing of information in the aforesaid example, basic structures and optical functions remain unchanged even for recording of information, and thermochemical changes are made in a recording layer for recording by forming a converged-light spot on a recording surface of an optical information recording medium.

Further, it is naturally possible to provide an optical element having an optical correcting structure for conducting temperature compensation and/or chromatic aberration compensation in an optical path in case of need. These optical correcting structures can be realized by a diffractive structure or by a phase difference furnishing structure, and can be provided on an objective optical element, a collimator and other elements.

Second Embodiment

The invention described in Item 1-5 will be explained as follows, referring to FIG. 1.

For each optical element, an explanation will be omitted for the functions which are the same as those in the First Embodiment.

In the present example, objective optical element OBL is made to have the role of the first compatible optical element. Collimator CL3 is made to have the role of the second compatible optical element.

In other words, the objective optical element OBL representing the first compatible optical element is arranged in the optical path through which all light sources pass, and the collimator CL3 representing the second compatible optical element is arranged in the optical path through which the third light source only passes.

By the way, the objective optical element OBL representing the first compatible optical element has a diffractive structure by which compatibility (first compatibility function) between "high density optical disc" and DVD is attained.

Specifically, spherical aberration based on a wavelength difference between the first light source and the second light source is corrected. Further, it is also possible to obtain the same optical function with a phase difference furnishing structure in place of the diffractive structure.

Incidentally, with respect to an optical information recording medium, if there is a difference in protective substrate thickness, there is caused spherical aberration based on the difference. However, in this case, the protective substrate having a thickness of 0.6 mm is used for both "high density optical disc" and DVD, which prevents occurrence of spherical aberration based on a difference in protective substrate thickness.

The diffractive structure is provided also on the collimator CL3 representing the second compatible optical element. When this diffractive structure is combined with the diffractive structure on the objective optical element OBL, compatibility between "high density optical disc" and CD and compatibility (second compatibility function) between DVD and CD are attained.

To be concrete, when compatibility between "high density optical disc" and CD is considered, working wavelengths and protective substrate thicknesses are different, and therefore, both spherical aberration based on a difference in thicknesses between the first light source and the third light source and spherical aberration based on a difference of protective substrate thicknesses 19 (0.1 mm and 1.2 mm) are corrected.

The foregoing also applies to compatibility between DVD and CD, and spherical aberration based on a difference in wavelengths between the second light source and the third light source and spherical aberration based on a difference in protective substrate thicknesses 19 (0.6 mm and 1.2 mm) are corrected.

Owing to the foregoing, it is possible to form a satisfactory converged-light spot on each optical information recording medium.

Since a converged-light spot can be formed by diffracted light with a different diffraction order number, in the same way as in the previous embodiment, an amount of light can be secured for "high density optical disc" and DVD, and recording and/or reproducing of information can be conducted.

Though there has been shown an example (Item 1-9) wherein a diffractive optical element is provided on collimator CL3 as the second compatible optical element, it is also possible to obtain the same optical function even when a dichroic filter having a property of selecting a wavelength and a liquid crystal capable of switching optical functions electrically, for example, are used (Items 1-7 and 1-8). In particular, a liquid crystal makes dynamic control possible because it has a function to change the refractive index.

In addition, for the first compatible function and the second compatible function, it is possible to attain them by providing a phase difference furnishing structure.

Third Embodiment

This example is one corresponding to the invention of Item 1-11, and it is an optical pickup device wherein a coupling lens is provided in place of the prescribed collimator for the structure shown in FIG. 1. Specifically, coupling lenses Co 1-Co 3 are provided in place of the collimators CL 1-3.

Since there is not provided a collimator that collimates incident light from a light source into parallel light, finite divergent light enters an objective optical element. Since the power of the coupling lens is not as great as that of the collimator, the coupling lens is small in size, and this structure using the coupling lens makes a pickup device to be small.

When a finite divergent light is used in place of an infinite parallel light, magnification of a light flux entering objective optical element OBL is changed, and thereby, spherical aberration based on a wavelength difference and that based on a substrate thickness difference are corrected, which has been known. However, there is sometimes an occasion where sufficient correction is impossible.

Further, the use of a finite light causes a problem that temperature characteristics are deteriorated, and also causes spherical aberration based on a difference of magnification of an incident light flux, which needs to be solved.

In the present example, therefore, a light flux having a magnification which is different dependent on each wavelength is made to enter objective optical element OBL, and spherical aberration based on a wavelength difference, that based on a protective substrate thickness difference and that based on a magnification difference of a light flux are corrected by the first and second compatible optical elements.

The first compatible optical element is one wherein a diffractive optical element is proved on an objective optical element in the same way as in the Second Embodiment, while, the second compatible optical element is one wherein a diffractive optical element is proved on coupling lens Co 3.

Due to this, all of the light fluxes emitted respectively from the first-third light sources enter objective optical element OBL in the form of a finite divergent light, thus, all spherical aberrations are corrected and satisfactory converged-light spots are formed.

In this case, an infinite divergent light enters objective optical element OBL for all light sources. However, it is also possible to arrange so that an infinite divergent light enters objective optical element OBL for only one light source, and an infinite parallel light enters for other light sources.

Fourth Embodiment

Another embodiment of the invention of Item 1-1 will be explained as follows, referring to FIG. 2. Those having the same symbols as those in the First Embodiment have the same functions basically, thus, different items only will be explained. Incidentally, the same also applies to the optical functions.

In this example, the light source is composed of two units. To be concrete, LD2' in FIG. 2 represents a light source unit of the so-called two-laser one package wherein the second light source (light source for DVD) and the third light source (light source for CD) are housed in the same package.

Since an adjustment is made so that the second light source in the package may be on the optical axis, the third light source is positioned to be away from the optical axis, and an image height is caused. However, technologies to improve this characteristic have already been known, and these technologies can be applied according to circumstances. In this case, correction plate DP is used to conduct that correction. On the correction plate DP, there is formed a grating which corrects the deviation from the optical axis and contributes to light-converging on sensor S2.

Incidentally, solid lines drawn from LD2' represent a light flux for DVD and dotted lines drawn from LD2' represent a light flux for CD.

BS2 is arranged for putting a light flux coming from LD1 and a light flux coming from LD2' on the same optical path. BS3 is arranged to make a light flux coming from LD2' to enter sensor lens S12.

A light flux emitted from LD1 passes through BS1 and enters collimator CL1 which collimates the light flux to be infinite parallel light, then, passes through BS2 to enter objective lens OBL representing an objective optical element. Then, it forms a converged-light spot on an information recording surface through a protective substrate of the first optical information recording medium. After being reflected on the information recording surface, it takes the same path and passes through collimator CL1 to be converged on sensor S1 by BS1 through sensor lens SL1, to be converted photoelectrically to become electric signals.

A light spot emitted from LD2' also forms a converged-light spot on an optical disc (second optical information recording medium or third optical information recording medium) equally and is reflected to form finally on sensor s2.

In the present example, objective optical element OBL is made to have a role of "a diffractive optical element which is arranged in a common optical path for the first, second and third optical information recording media and has a diffractive structure". Therefore, a serrated diffractive structure is provided on an objective optical element.

A pitch of the serration (diffracting power) and its depth (a blazed wavelength) are established so that a light flux coming from the first light source is formed as a converged-light spot by the second order diffracted light for a "high density optical disc", and a light flux coming from the second light source is formed as a converged-light spot by the first order diffracted light for DVD.

By using light each having a different diffraction order number, it is possible to enhance diffraction efficiency in each occasion and to secure an amount of light.

For CD, it is preferable to make a light flux from the third light source to be the diffracted light having the order number equivalent to that for DVD, but the other order number may also be used according to circumstances. In the present example, a converged-light spot is formed as diffracted light having the first order number equivalent to that for DVD.

Though there has been explained an example wherein a diffractive structure is provided on an objective optical element as a diffractive optical element in Items 1-3 and 1-4, it is also possible to provide a diffractive structure generating such diffracted light with different order number on a collimator CL1, or to provide another optical element in an optical path.

Further, for switching of openings, it is possible to apply known technologies including a diffractive optical element.

Incidentally, though there has been explained reproducing of information in the aforesaid example, basic structures and optical functions remain unchanged even for recording of information, and thermochemical changes are made in a recording layer for recording by forming a converged-light spot on a recording surface of an optical information recording medium.

Further, it is naturally possible to provide an optical element having an optical correcting structure for conducting temperature compensation and/or chromatic aberration compensation in an optical path in case of need. These optical correcting structures can be realized by a diffractive structure or by a phase difference furnishing structure, and can be provided on an objective optical element, a collimator and other elements.

Fifth Embodiment

Another embodiment of the invention described in Item 1-5 will be explained as follows, referring to FIG. 2.

For each optical element, an explanation will be omitted for the functions which are the same as those in the Fourth Embodiment.

In the present example, objective optical element OBL is made to have the role of the first compatible optical element. Collimator CL2 is made to have the role of the second compatible optical element.

In other words, the objective optical element OBL representing the first compatible optical element is arranged in the optical path through which all light sources pass, and the collimator CL2 representing the second compatible optical element is arranged in the optical path through which the second light source and the third light source pass.

By the way, the objective optical element OBL representing the first compatible optical element has a diffractive structure which contributes to formation of a converged-light spot necessary for a "high density optical disk".

Specifically, spherical aberration based on a wavelength difference between the first light source and the second light source and spherical aberration based on a wavelength difference between the first light source and the third light source are corrected. Further, spherical aberration based on a protective substrate thickness difference between the "high density optical disk" and CD is corrected.

Further, it is also possible to obtain the same optical function with a phase difference furnishing structure in place of the diffractive structure.

Incidentally, with respect to an optical information recording medium, if there is a difference in protective substrate thickness, there is caused spherical aberration based on the difference. However, in this case, the protective substrate having a thickness of 0.6 mm is used for both "high density optical disc" and DVD, which prevents occurrence of spherical aberration based on a difference in protective substrate thickness.

The diffractive structure is provided also on the collimator CL2 representing the second compatible optical element. When this diffractive structure is combined with the diffractive structure on the objective optical element OBL, compatibility (second compatibility function) between DVD and is attained.

When compatibility between DVD and CD is considered, working wavelengths and protective substrate thicknesses are different, and therefore, both spherical aberration based on a difference in thicknesses between the second light source and the third light source and spherical aberration based on a difference of protective substrate thicknesses 19 (0.6 mm and 1.2 mm) are corrected.

Owing to the foregoing, it is possible to form a satisfactory converged-light spot on each optical information recording medium.

Since a converged-light spot can be formed by diffracted light with a different diffraction order number, in the same way as in the previous embodiment, an amount of light can be secured for "high density optical disc" and DVD, and recording and/or reproducing of information can be conducted.

Though there has been shown an example (Item 1-9) wherein a diffractive optical element is provided on collimator CL2 as the second compatible optical element, it is also possible to obtain the same optical function even when a dichroic filter having a property of selecting a wavelength and a liquid crystal capable of switching optical functions electrically, for example, are used (Items 1-7 and 1-8). In particular, a liquid crystal makes dynamic control possible because it has a function to change the refractive index.

In addition, for the first compatible function and the second compatible function, it is possible to attain them by providing a phase difference furnishing structure.

Sixth Embodiment

Figure 2:
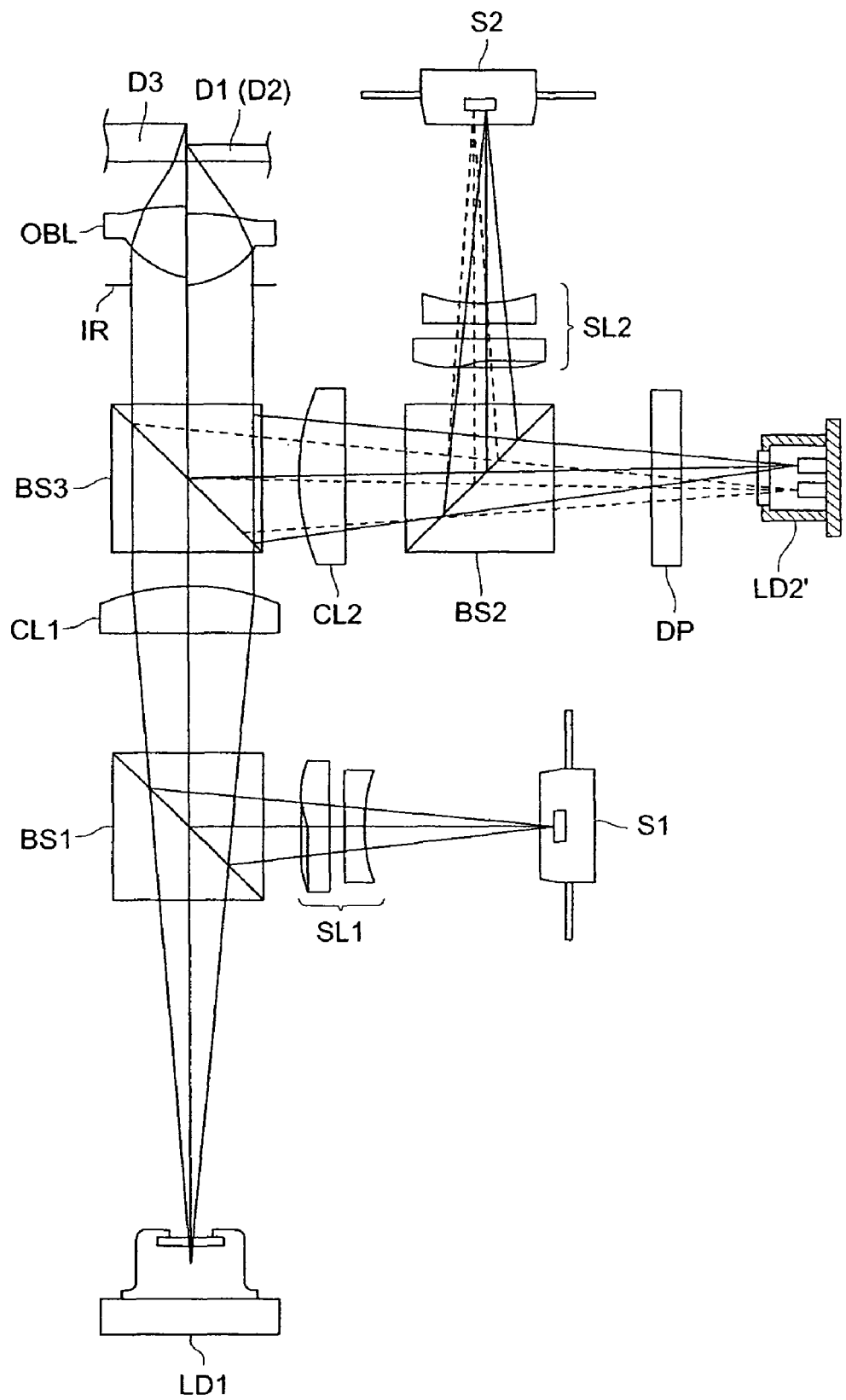
FIG. 2 is a diagram of an optical pickup device in another embodiment relating to the invention.

This example is another example corresponding to the invention of Item 1-11, and it is an optical pickup device wherein a coupling lens is provided in place of the prescribed collimator for the structure shown in FIG. 2. Specifically, coupling lenses Co 1 and Co 2 are provided in place of the collimators CL 1 and Cl 2.

Since there is not provided a collimator that collimates incident light from a light source into parallel light, finite divergent light enters an objective optical element. Since the power of the coupling lens is not as great as that of the collimator, the coupling lens is small in size, and this structure using the coupling lens makes a pickup device to be small.

When a finite divergent light is used in place of an infinite parallel light, magnification of a light flux entering objective optical element OBL is changed, and thereby, spherical aberration based on a wavelength difference and that based on a substrate thickness difference are corrected, which has been known. However, there is sometimes an occasion where sufficient correction is impossible.

Further, the use of a finite light causes a problem that temperature characteristics are deteriorated, and also causes spherical aberration based on a difference of magnification of an incident light flux, which needs to be solved.

In the present example, therefore, a light flux having a magnification which is different dependent on each wavelength is made to enter objective optical element OBL, and spherical aberration based on a wavelength difference, that based on a protective substrate thickness difference and that based on a magnification difference of a light flux are corrected by the first and second compatible optical elements.

The first compatible optical element is one wherein a diffractive optical element is proved on an objective optical element in the same way as in the Fifth Embodiment, while, the second compatible optical element is one wherein a diffractive optical element is proved on coupling lens Co 2.

Due to this, all of the light fluxes emitted respectively from the first-third light sources enter objective optical element OBL in the form of a finite divergent light, thus, all spherical aberrations are corrected and satisfactory converged-light spots are formed.

In this case, an infinite divergent light enters objective optical element OBL for all light sources. However, it is also possible to arrange so that an infinite divergent light enters objective optical element OBL for only one light source, and an infinite parallel light enters for other light sources.

Sixth Embodiment

Figure 3:
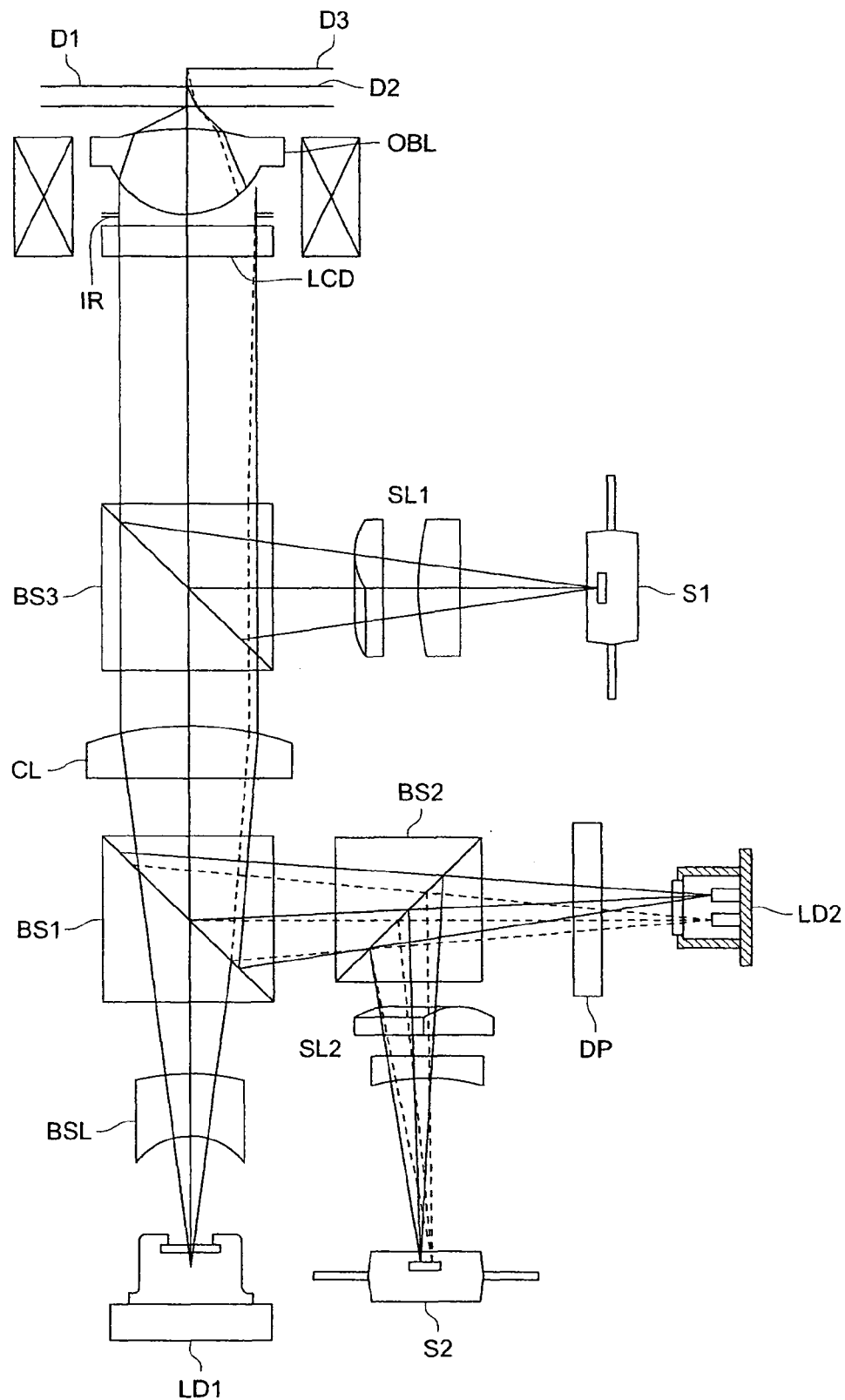
FIG. 3 is a diagram of an optical pickup device in still another embodiment relating to the invention.

Inventions in Item 1-16 or 17 will be explained as follows, referring to FIG. 3.

For each optical element, an explanation will be omitted for the functions which are the same as those in the First-Fifth Embodiments.

Single plastic lens OBL representing an objective optical element is united with liquid crystal element LCD solidly by lens holder LH. AC represents an actuator which can hold the lens holder LH to move in the direction of an optical axis for focusing.

On the optical functional surface of the single plastic lens OBL, there is provided a diffractive structure which corresponds to the diffractive optical element that is mentioned in the Items.

Though the single lens made of plastic is mentioned in this case, it may also be one wherein plural lenses of two or more are combined, or it may be a lens made of glass.

On the liquid crystal element LCD, there is provided a pattern that is symmetrical about an optical axis, and it is possible to switch optical functions for an incident light flux by changing electric state of energizing. This corresponds to the compatible optical element mentioned in the Items.

A structure is arranged so that a light flux that is made by each collimator to be an infinite parallel light may enter the liquid crystal element.

Though an optical system utilizing an infinite parallel light has various merits, it also has a demerit, on the contrary, that low order aberrations having an influence on formation of a converged-light spot are caused. It is therefore difficult to cope with three types of optical information recording media by means of an objective optical element alone.

In the invention described in Item 1-16, therefore, a diffractive structure and an aspheric surface are designed so that an objective optical element provided with a diffracting surface may be used independently for a "high density optical disc" representing the first optical information recording medium, but it may have insufficient functions (functions unable to form a sufficient converged-light spot for reproducing and/or recording of information).

Then, a compatible optical element (liquid crystal element) that is separate from the foregoing is prepared to be combined with an objective optical element, and insufficient points in the objective optical element are improved so that sufficient converged-light spot may be formed for reproducing and/or recording of information for the second optical information recording medium (DVD) and the third optical information recording medium (CD) may be formed.

Incidentally, for a light flux with wavelength $\lambda 2$ (655 nm) used for the second optical information recording medium (DVD) and a light flux with wavelength $\lambda 3$ (780 nm) used for the third optical information recording medium (CD), the objective optical element uses a diffracted light with order number that is different from that of a light flux with wavelength $\lambda 1$ (405 nm) so that the diffraction efficiency may be high to the utmost, and a load for correction by a liquid crystal element may be reduced, although the efficiency is insufficient.

In the invention described in Item 1-17, design of an objective optical element equipped with a diffracting surface is devised, and a diffractive structure and an aspheric surface are designed so that the objective optical element may be used independently for two types of optical information recording media including the first optical information recording medium (high density optical disc) and either one of the second optical information recording medium (DVD) and the third optical information recording medium (CD). An optical function of another compatible optical element (liquid crystal element) is superimposed on an optical function of the objective optical element, so that a sufficient converged-light spot may be formed for reproducing and/or recording of information, for the remaining one type of optical information recording medium.

As stated above, the compatible optical element representing a liquid crystal element does not generate optical functions for the light flux with wavelength $\lambda 1$, and generates optical functions for the light flux with wavelength $\lambda 2$ and/or the light flux with wavelength $\lambda 3$ as occasion demands.

Incidentally, the objective optical element and the liquid crystal element both held solidly by lens holder LH can be regarded together as an objective optical element, and the present embodiment may be expressed as an applied example of the invention described in Item 1-1.

As the diffractive structure which has been described, it is also possible to employ a diffractive structure with the so-called multi-level structure wherein a shape of a staircase with a prescribed number of steps is repeated periodically, in addition to the serrated diffractive structure.

With respect to the order number of the diffracted light generated by the diffractive structure, various combinations can be used as occasion demands.

In the case of the invention described in Item 1-16, it is preferable to select combinations of the following order numbers. Incidentally, k represents the order number of the diffracted light generated for the light flux with wavelength $\lambda 1$, m represents the order number of the diffracted light generated for the light flux with wavelength $\lambda 2$ and n represents the order number of the diffracted light generated for the light flux with wavelength $\lambda 3$.

a) k=1, m=0, n=2
b) k=2, m=1, n=1
c) k=2, m=1, n=0
d) k=2, m=2, n=1
e) k=3, m=2, n=2
f) k=4, m=3, n=2
g) k=5, m=3, n=2
h) k=5, m=3, n=3
i) k=6, m=4, n=3
j) k=7, m=4, n=4
k) k=8, m=5, n=4

Combinations of the order numbers identical to the foregoing are preferable, even when conducting compatibility between the first optical information recording medium and the second optical information recording medium with the objective optical element, and attaining compatibility with the third optical information recording medium by combining with a liquid crystal element, in the case of invention described in Item 1-17.

When conducting compatibility between the first optical information recording medium and the second optical information recording medium with the objective optical element, and attaining compatibility with the third optical information recording medium by combining with a liquid crystal element, in the case of invention described in Item 1-17, wavelength of $\lambda 1$ and that of $\lambda 3$ show the relationship of almost two times, and therefore, if k:n is 2:1, diffracting functions generated are Therefore, it is preferable to employ the following combinations which are the results of excluding the occasions where k:n is 2:1 from the combinations from a) to k).

a) k=1, m=0, n=2
c) k=2, m=1, n=0
e) k=3, m=2, n=2
g) k=5, m=3, n=2
h) k=5, m=3, n=3
j) k=7, m=4, n=4

Seventh Embodiment

Figure 4:
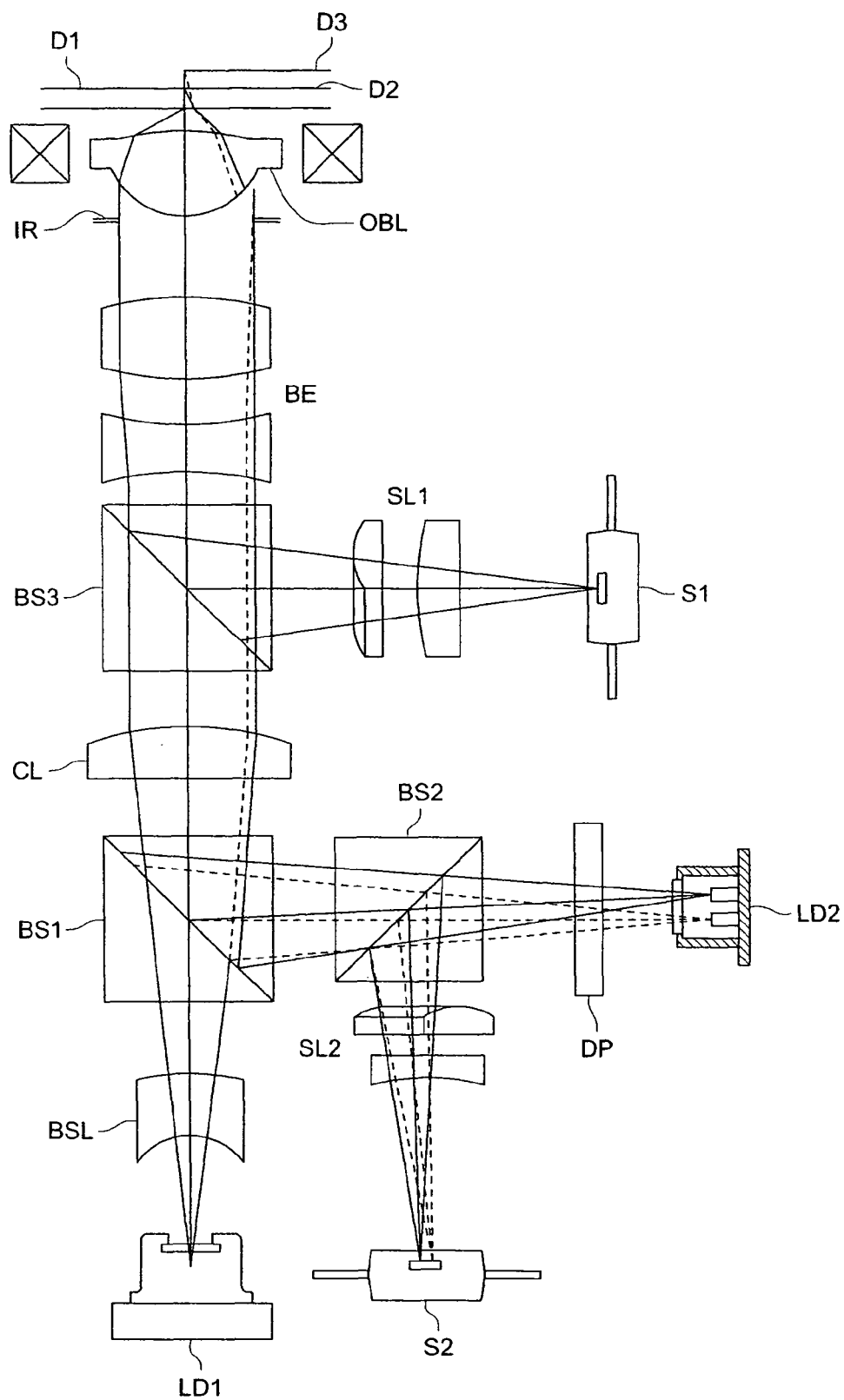
FIG. 4 is a diagram of an optical pickup device in further another embodiment relating to the invention.

Another embodiment of the inventions in Item 1-16 or 1-17 will be explained as follows, referring to FIG. 4.

This is one wherein beam expander BE that is movable in the axial direction is provided in place of liquid crystal element LCD.

This beam expander is provided with its own actuator to be capable of moving in the axial direction. This corrects spherical aberration.

When it is actually used, it is made to advance or retreat in the axial direction to correct spherical aberration in accordance with a light flux from the working light source, and an excellent converged-light spot is formed on the corresponding optical information recording medium.

With respect to the objective lens representing a diffractive optical element and its functions, they are the same as those in the Sixth Embodiment, and they can form an excellent converged-light spot independently on at least the first optical information recording medium. For the second and third optical information recording media, sufficient power to form a converged-light spot is not possessed, or, a converged-light spot can be formed on only one of them.

Further, for that purpose, a structure is arranged so that diffracted light each having a different order number for each wavelength are generated.

The beam expander representing a compatible optical element can advance or retreat in the axial direction as stated above, and thereby, spherical aberration can be corrected. Therefore, by offsetting insufficient points with an objective optical element, it is possible to form excellent converged-light spots on the second optical information recording medium and/or the third optical information recording medium.

Incidentally, there may also be the structure to unite the beam expander and the objective optical element solidly, although this leads to a large-sized optical element. This structure is preferable from the viewpoint of aberration correction for the third optical information recording medium.

As stated above, the invention makes it possible to realize an optical pickup device that is compatible for three formats of optical discs and is compact in structure, wherein an amount of light can be secured and performance is excellent.

Eighth Embodiment

The invention described in Item 2-1 will be explained as follows; referring to FIG. 1 which is explained before.

In this embodiment, light fluxes having respectively wavelengths λ1-λ3 emitted respectively from LD1-LD3 enter objective optical element OBL representing a diffractive optical element having the first diffractive structure as infinite parallel light, in other words, at substantially the same angle, as stated above.

Incidentally, "the same angle" means the same angle of divergence or the same angle of convergence, and in the case of infinite parallel light, an angle of divergence (or an angle of convergence) is zero.

In this embodiment, by using light wherein diffraction order is different based on relationship between wavelength λ1 and wavelength λ2 as stated above, it is possible to enhance diffraction efficiency in each case and to secure an amount of light.

For CD, it is preferable to use $k^{th}$ order (m/2, when the diffraction order for wavelength λ1 is m) based on relationship between wavelength λ1 and wavelength λ3.

In this example, a converged-light spot is formed as the first order diffracted light, which is the same as one in DVD.

Though there has been explained an example wherein a diffractive structure is provided on an objective optical element as a diffractive optical element, likewise Items 2-4 and 2-6, it is possible to provide this diffractive structure that generates a different order diffracted light on a collimator, and to provide another optical element in an optical path.

Ninth Embodiment

The invention described in Item 2-7 will be explained as follows, referring to the FIG. 1.

Though there has been shown an example (Item 2-11) wherein the diffractive optical element is provided on the collimator CL3, as the second compatible optical element, in the present example, it is also possible to obtain the same optical functions (Item 2-10) by using an optical element (Item 2-9) wherein an optical path difference furnishing structure that gives only a phase, or by using a liquid crystal element capable of switching optical functions electrically. In particular, the liquid crystal element makes it possible to conduct dynamic control because it has a function to change the refractive index. Further, it is also possible to conduct compatibility between the first compatible optical element and the diffractive structure, and to use a dichroic filter that plays a role of a CD-side diaphragm only.

In addition to the foregoing, it is also possible to attain by providing a phase difference furnishing structure together with the first compatible function and the second compatible function.

Tenth Embodiment

This embodiment corresponds to the invention described in each of Items 2-1 and 2-2, and it is an optical pickup device on which a coupling lens is provided in place of a prescribed collimator in the structure shown in FIG. 1. Specifically, coupling lenses Co 1-3 (not shown) are provided in place of collimators CL1-CL3.

Due to this, all light fluxes emitted respectively from the first-third light sources enter the objective optical element OBL in a form of a finite divergent light, thus, all spherical aberrations are corrected, and an appropriate converged-light spot is formed.

Since the coupling lenses Co 1-3 are used in place of the collimators CL 1-3 in this case, all light fluxes emitted from all light sources enter the objective optical element in a form of divergent light. However, it is also possible to make any one of them to be a collimator so that infinite parallel light may enter an objective lens.

Eleventh Embodiment

Another embodiment of the invention described in Item 2-1 will be explained as follows, referring to FIG. 2. Those having the same symbols as in the First Embodiment have basically the same functions as in the Eighth Embodiment, and different ones only will be explained accordingly. For the optical functions, the foregoing can substantially be applied.

In this embodiment, by using light wherein diffraction order is different based on relationship between wavelength λ1 and wavelength λ2 as stated above, it is possible to enhance diffraction efficiency in each case and to secure an amount of light.

For CD, it is preferable to use $k^{th}$ order (m/2, when the diffraction order for wavelength λ1 is m) based on relationship between wavelength λ1 and wavelength λ3.

In this example, a converged-light spot is formed as the first order diffracted light, which is the same as one in DVD.

Though there has been explained an example wherein a diffractive structure is provided on an objective optical element as a diffractive optical element, likewise Items 2-4 and 2-6, it is possible to provide this diffractive structure that generates a different order diffracted light on a collimator CL1, and to provide another optical element in an optical path.

Twelfth Embodiment

Another embodiment of the invention described in Item 2-7 will be explained as follows, referring to the FIG. 2. With respect to each optical element, an explanation of the functions which are the same as those in the Eleventh Embodiment will be omitted. In the present example, objective optical element OBL is made to have a role of the first compatible optical element. On the other hand, collimator CL2 is made to have a role of the second compatible optical element. Namely, the objective optical element OBL representing the first compatible optical element is arranged in the optical path through which all light sources pass, and the collimator CL2 representing the second compatible optical element is arranged in the optical path through which the second light source the third light source pass.

Though there has been shown an example (Item 2-11) wherein the diffractive optical element is provided on the collimator CL2, as the second compatible optical element, in the present example, it is also possible to obtain the same optical functions (Item 2-10) by using an optical element (Item 2-9) wherein an optical path difference furnishing structure that gives only a phase, or by using a liquid crystal element capable of switching optical functions electrically. In particular, the liquid crystal element makes it possible to conduct dynamic control because it has a function to change the refractive index. Further, it is also possible to conduct compatibility between the first compatible optical element and the diffractive structure, and to use a dichroic filter that plays a role of a CD-side diaphragm only.

Thirteenth Embodiment

This embodiment corresponds to the invention described in each of Items 2-1 and 2-2, and it is an optical pickup device on which a coupling lens is provided in place of a prescribed collimator in the structure shown in FIG. 1. Specifically, coupling lenses Co 1-3 (not shown) are provided in place of collimators CL1-CL3.

Since there is not provided a collimator that collimates an incident light coming from a light source to be parallel light, finite divergent light enters an objective optical element. Since the coupling lens does not have power that is as great as that of the collimator, a size of the coupling lens is small, which makes a pickup device to be small.

Since the coupling lenses Co 1-3 are used in place of the collimators CL 1-3 in this case, all light fluxes emitted from all light sources enter the objective optical element in a form of divergent light. However, it is also possible to make any one of them to be a collimator so that infinite parallel light may enter an objective lens.

Fourteenth Embodiment

Figure 5:
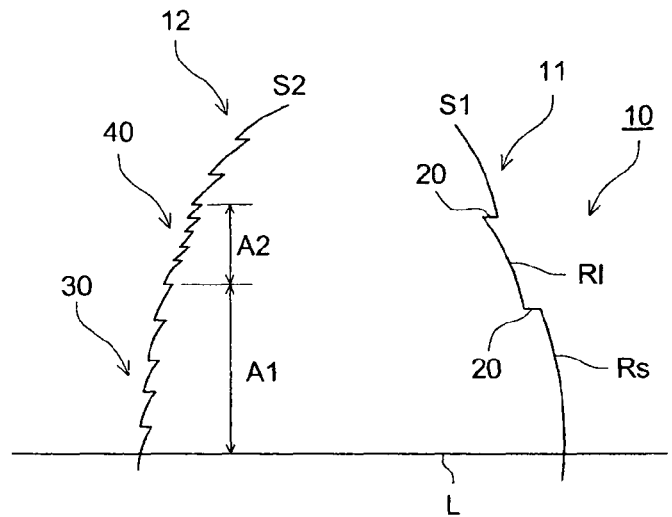
FIG. 5 is a vertical sectional view of primary portions showing the structure of an objective optical element.

In this example, as shown in FIG. 5, plural (two) ring-shaped zonal optical surfaces (Rs and R1) having their centers on optical axis L are formed continuously through stepped surface 20 on an area on optical surface 11 (emergence surface) of objective optical element 10 through which a light flux with wavelength $\lambda 3$ that forms a converged-light spot with numerical aperture NA3 on an image recording surface of CD representing the third optical information recording medium passes, as shown in FIG. 5. Incidentally, in the following explanation, the total optical surface on which ring-shaped zonal optical surfaces are formed is sometimes expressed as "S1 surface".

It is preferable that the number of these ring-shaped zonal optical surfaces is either one within a range of 2-10.

Now, let it be assumed that Rs represents a ring-shaped zonal optical surface including optical axis L and R1 represents a ring-shaped zonal optical surface that is farthest from the optical axis, among the two ring-shaped zonal optical surfaces.

Incidentally, with respect to the ring-shaped zonal optical surface Rs including optical axis L, it is assumed to include also an occasion wherein a form of the ring-shaped zonal optical surface viewed in the direction of optical axis L is not a "ring-shaped zone" but is mostly a circular form whose center is optical axis L. A form of the ring-shaped zonal optical surface Rs in the present embodiment is mostly a circular form when it is viewed in the direction of optical axis L.

It is preferable that a length of the stepped surface 20 closer to the optical axis L in the direction that is in parallel with optical axis L, among two stepped surfaces 20 each adjoining the ring-shaped zonal optical surface R1, is shorter than a length of the other stepped surface 20 in the direction being in parallel with optical axis L.

The ring-shaped zonal optical surface Rs is composed of a refracting interface, and light fluxes having respectively wavelengths $\lambda 1$, $\lambda 2$ and $\lambda 3$ which have passed the ring-shaped zonal optical surface Rs are arranged to form converged-light spots respectively on information recording surfaces of respective optical information recording media ("high density optical disk", DVD and CD).

The ring-shaped zonal optical surface R1 is also composed of a refracting interface, and it is formed to be deviated toward a light source from the ring-shaped zonal optical surface Rs by a prescribed distance.

A light flux having wavelength $\lambda 3$ which has passed through the ring-shaped zonal optical surface R1 is also arranged to form a converged-light spot on the information recording surface of the third optical information recording medium.

On the other optical surface 12 (plane of incidence) of objective optical element 10, there is formed a diffracting ring-shaped zones representing the first diffractive structure 30. Incidentally, in the following explanation, the total optical surface on which the first diffractive structure 30 is formed is sometimes expressed as "S2 surface".

The first diffractive structure 30 is formed on an area on plane of incidence 12 (hereinafter referred to also as area A1) through which a light flux having wavelength $\lambda 3$ that forms a converged-light spot with numerical aperture NA3 on the third optical information recording medium passes.

The area A1 on which the first diffractive structure is formed corresponds to an area through which the light fluxes respectively having wavelengths $\lambda 1$, $\lambda 2$ and $\lambda 3$ which form converged-light spots respectively on optical information recording media after passing through the ring-shaped zonal optical surface Rs pass.

In the present embodiment, a diffracting ring-shaped zone representing the second diffractive structure 40 is formed on an area (hereinafter referred to also as area A2) which is a portion that is farther from optical axis L than the area A1 is, and a portion through which the light fluxes having respectively wavelengths $\lambda 1$, $\lambda 2$ and $\lambda 3$ which form converged-light spots respectively on optical information recording media pass.

A structure of the area that is farther from the optical axis than the area A2 is not limited, and diffracting ring-shaped zones are formed in the present embodiment. An explanation of the diffracting ring-shaped zones will be omitted because they are known.

Thus, $m^{th}$, $n^{th}$ and $k^{th}$ order diffracted light having respectively wavelengths $\lambda 1$, $\lambda 2$ and $\lambda 3$ which are generated by the first diffractive structure are converged respectively on information recording surfaces of optical information recording media to conduct reproducing and/or recording of information.

In this case, it is preferable to construct so that light fluxes having respectively wavelengths $\lambda 1$ and $\lambda 2$ enter objective optical element 10 at the same angle of divergence or as the same infinite light, and first diffractive structure 30 corrects spherical aberration caused when light fluxes having respectively wavelengths $\lambda 1$ and $\lambda 2$ pass respectively through optical surfaces 10 and 12 of the objective optical element 10, by means of a difference between wavelength λ1 and wavelength λ2.

Further, it is preferable to make each diffracted light to be either one of combinations of (m, n) (8,5), (6,4), (2,1), (5,3), (2,2), (3,2), (10,6), furthermore, it is preferable to make each diffracted light to be either one of combinations of (m, n, k)=(2,1,1), (2,1,0), (5,3,2), (2,2,1), (3,2,2).

Further, when light fluxes having respectively wavelengths λ1, λ2 and λ3 enter, it is preferable that a combination of diffracted light that creates the maximum diffraction efficiency among diffracted light of each light flux generated by the first diffractive structure 30 is different from a combination of diffracted light that creates the maximum diffraction efficiency among diffracted light of each light flux generated by the second diffractive structure 40.

Although it is preferable that a combination of diffracted light that generates the maximum diffraction efficiency among diffracted light of respective light fluxes generated by the second diffractive structure 40 is a combination of 1, 1 and 1, the invention is not limited to this.

Further, it is preferable to satisfy k=m/2 under the conditions of 370 nm≦λ1≦430 nm and 760 nm≦λ3≦810 nm.

It is further preferable that both of the diffraction efficiency for the $m^{th}$ order diffracted light and that for the $n^{th}$ order diffracted light are 80% or more.

Further, it is preferable that the diffraction efficiency for the $k^{th}$ order diffracted light is 40% or more.

Figure 6:
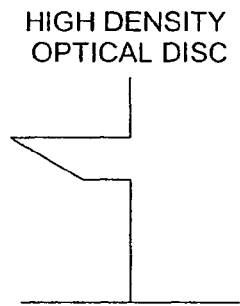
FIG. 6(a) to 6(c) each shows a vertical spherical aberration diagram.
Figure 6:
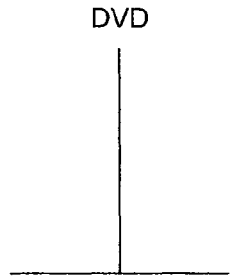
Figure 6:
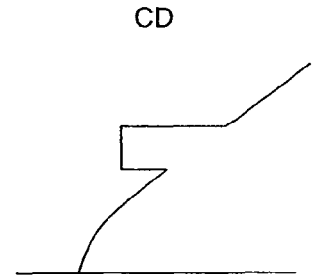

FIG. 6 shows an example of a vertical spherical aberration diagram on each information recording surface of a high density optical disc, DVD and CD in the case of using objective optical element 10 structured in the aforesaid way for an optical pickup device. Incidentally, in the following FIGS. 6, 7, 10 and 12, a vertical axis represents a numerical aperture and a horizontal axis represents an amount of spherical aberration.

As shown in FIG. 6 (a), with respect to a light flux having wavelength λ1 used for a high density optical disk, its spherical aberration is not changed within a numerical aperture corresponding to the place where ring-shaped zonal optical surface Rs is formed, namely, a light flux having wavelength λ1 which has passed the ring-shaped zonal optical surface Rs is converged on an information recording surface of the first optical information recording medium, to be substantially free from any aberrations.

On the other hand, within a numerical aperture corresponding to the place where ring-shaped zonal optical surface R1 is formed, spherical aberrations become discontinuous toward the "under" side.

Incidentally, when the combination of the orders of diffracted light that makes the diffraction efficiency to be maximum when light fluxes having respectively wavelengths λ1, λ2 and λ3 enter is changed by changing a form of the second diffraction structure, it is also possible to make the spherical aberration to be discontinuous toward the "over" side.

It is relatively easy to design forms of S1 surface and S2 surface so that spherical aberrations may be within a range of no trouble in practical use when the total area corresponding to numerical aperture NA1 is considered.

As shown in FIG. 6 (b), with respect to a light flux having wavelength λ2 used for DVD, its spherical aberration is not changed within a numerical aperture corresponding to the place where ring-shaped zonal optical surface Rs is formed, namely, a light flux having wavelength λ2 which has passed the ring-shaped zonal optical surface Rs is converged on an information recording surface of the second optical information recording medium, to be substantially free from any aberrations.

Further, the spherical aberration is not changed even within a numerical aperture corresponding to the place where ring-shaped zonal optical surface R1 is formed, namely, a light flux having wavelength λ2 which has passed the ring-shaped zonal optical surface R1 is converged on an information recording surface of the second optical information recording medium, to be substantially free from any aberrations.

Therefore, it is possible to make spherical aberrations to be almost zero when the total area corresponding to numerical aperture NA2 is considered.

As shown in FIG. 6 (c), with respect to a light flux having wavelength λ3 used for CD, its spherical aberration grows greater toward the "over" side within a numerical aperture corresponding to the place where ring-shaped zonal optical surface Rs is formed.

On the other hand, within a numerical aperture corresponding to the place where ring-shaped zonal optical surface R1 is formed, spherical aberrations become discontinuous toward the "under" side.

It is relatively easy to design forms of S1 surface and S2 surface so that spherical aberrations may be within a range of no trouble in practical use when the total area corresponding to numerical aperture NA3 is considered. Incidentally, a light flux having wavelength λ3 which has passed the position which is farther from the optical axis than the place where the ring-shaped zonal optical surface R1 is formed is, becomes a flare, and a diameter of the spot becomes to be equivalent to the necessary numerical aperture.

Incidentally, it is preferable that wavefront aberration of a converged-light spot that is formed by a light flux having wavelength λ3 on the third optical information recording medium is 0.050 (λ3 rms) or less.

It is further preferable that a paraxial ray of a light flux having wavelength λ3 is converged at a position that is closer to the light source than the position (best image surface position) in the direction of an optical axis that makes wavefront aberration of the converged-light spot formed by a light flux having wavelength λ3 on the third optical information recording medium to be smallest is.

Further, it is preferable that the light flux having wavelength having wavelength λ3 that has passed through the ring-shaped zonal optical surface Rs and the light flux having wavelength having wavelength λ3 that has passed through the ring-shaped zonal optical surface R1 are converged to be away from each other by 10 µm or more.

Further, it is preferable that a light flux of the wavelength λ3 having passed through the ring-shaped zone optical surface Rs and a light flux of the wavelength λ3 having passed through the ring-shaped zone optical surface R1 are converged distantly in the optical axis by 5 µm or more.

Further, it is preferable that a length D in the optical axis of a stepped surface between neighboring two ring-shaped zonal optical surfaces satisfies the formulas:

1.5 µm≦D≦2.0 µm, 2.0 µm≦D≦3.0 µm, or 3.0 µm≦D≦4.5 µm,

It is preferable that phase difference φ between a light flux with wavelength λ3 that has passed the ring-shaped zonal optical surface Rs and a light flux with wavelength λ3 that has passed a ring-shaped zonal optical surface other than the ring-shaped zonal optical surface Rs on the converged-light spot satisfies −0.1π≦φ≦0.1π.

Further, it is preferable that light-converged position fB3 of the light flux with wavelength λ3 that forms a converged-light spot after passing through the ring-shaped zonal optical surface R1 satisfies |fB3|≦5 μm in the direction of the optical axis for the best image surface of the converged-light spot formed by the light flux with wavelength λ3 on the third optical information recording medium.

The objective optical element shown in the present embodiment and the optical pickup device employing the objective optical element make it possible to have compatibility for three types of optical information recording media.

Figure 7:
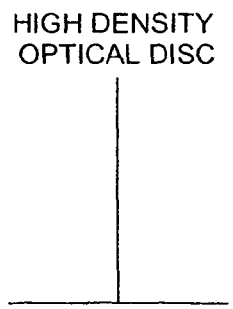
FIG. 7(a) to 7(c) each shows a vertical spherical aberration diagram.
Figure 7:
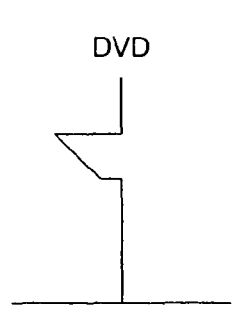
Figure 7:
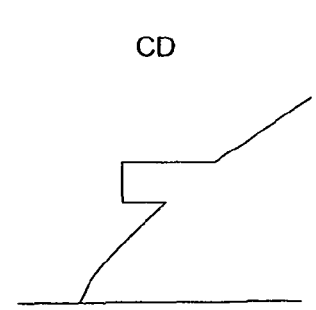

It is also possible to use an objective optical element wherein S1 surface and S2 surface are structured as shown in FIG. 5 by changing the second diffraction structure and a surface form of the ring-shaped zonal optical surface R1, and a vertical spherical aberration diagram is like one shown in FIG. 7.

As shown in FIG. 7 (a), with respect to a light flux having wavelength λ1 used for a high density optical disk, its spherical aberration is not changed within a numerical aperture corresponding to the place where ring-shaped zonal optical surface Rs is formed, namely, a light flux having wavelength λ1 which has passed the ring-shaped zonal optical surface Rs is converged on an information recording surface of the first optical information recording medium, to be substantially free from any aberrations.

Further, the spherical aberration is not changed even within a numerical aperture corresponding to the place where ring-shaped zonal optical surface R1 is formed, namely, a light flux having wavelength λ1 which has passed the ring-shaped zonal optical surface R1 is converged on an information recording surface of the first optical information recording medium, to be substantially free from any aberrations.

Therefore, it is possible to make spherical aberrations to be almost zero when the total area for numerical aperture NA1 and thereunder is considered.

As shown in FIG. 7(b), with respect to a light flux having wavelength λ2 used for DVD, its spherical aberration is not changed within a numerical aperture corresponding to the place where ring-shaped zonal optical surface Rs is formed, namely, a light flux having wavelength λ2 which has passed the ring-shaped zonal optical surface Rs is converged on an information recording surface of the second optical information recording medium, to be substantially free from any aberrations.

On the other hand, within a numerical aperture corresponding to the place where ring-shaped zonal optical surface R1 is formed, spherical aberrations become discontinuous toward the "under" side.

Incidentally, when the combination of the orders of diffracted light that makes the diffraction efficiency to be maximum when light fluxes having respectively wavelengths λ1, λ2 and λ3 enter is changed by changing a form of the second diffraction structure, it is also possible to make the spherical aberration to be discontinuous toward the "over" side.

It is relatively easy to design forms of S1 surface and S2 surface so that spherical aberrations may be within a range of no trouble in practical use when the total area corresponding to numerical aperture NA2 is considered.

In this case, a vertical spherical aberration diagram of a light flux with wavelength λ3 used for CD shown in FIG. 7(c) is the same as that shown in the FIG. 6.

Figure 8:
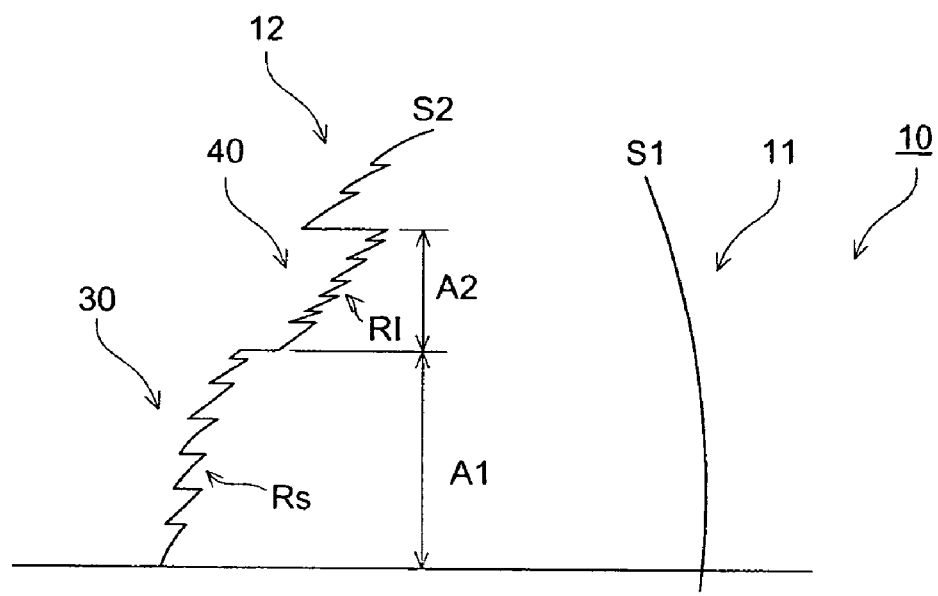
FIG. 8 is a vertical sectional view of primary portions showing the structure of an objective optical element.

Further, as shown in FIG. 8, an objective optical element wherein S1 surface and S2 surface shown in the Fourteenth Embodiment are combined on a plane of incidence may also be used.

To be concrete in explanation, the second total diffractive structure in area A2 is formed at the position which is deviated toward the optical information recording medium side by a prescribed distance.

Despite this structure, a vertical spherical aberration diagram is the same as that shown in FIG. 6 or FIG. 7, and it is possible to obtain an optical pickup device and an objective optical element which have compatibility for three types of optical information recording media.

Incidentally, an objective optical element wherein S1 surface and S2 surface are combined on a plane of emergence may also be used, though an illustration thereof is omitted here.

Fifteenth Embodiment

Figure 9:
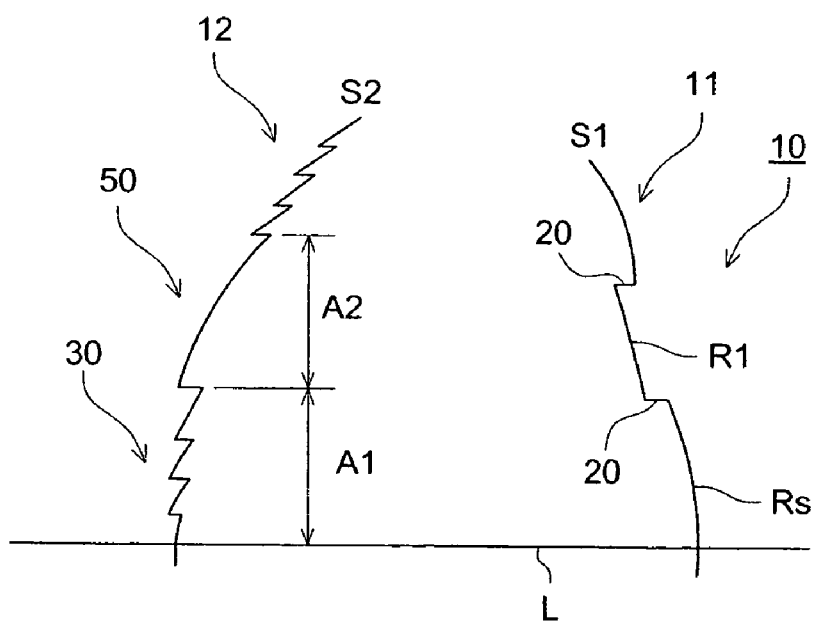
FIG. 9 is a vertical sectional view of primary portions showing the structure of an objective optical element.

Compared with the aforementioned Fourteenth Embodiment, an objective optical element shown in the present example is different only on the point that the area A2 is constituted with refracting interface 50 as shown in FIG. 9.

Figure 10:
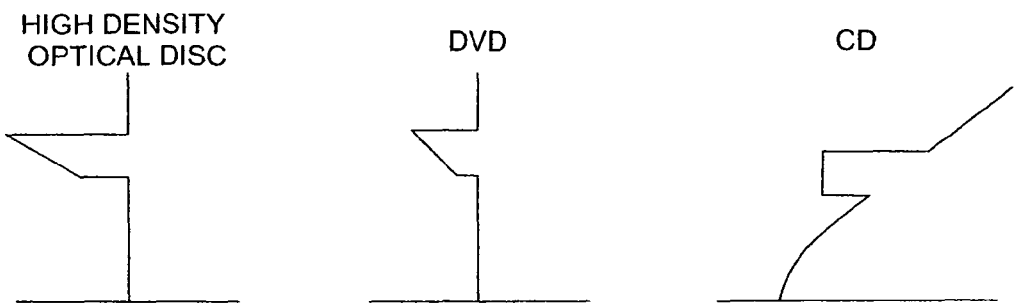
FIG. 10(*a*) to 10(*c*) each shows a vertical spherical aberration diagram.

FIG. 10 shows an example of a vertical spherical aberration diagram on each information recording surface of the high density disc, DVD and CD.

As shown in FIG. 10 (a), with respect to a light flux having wavelength λ1 used for a high density optical disk, its spherical aberration is not changed within a numerical aperture corresponding to the place where ring-shaped zonal optical surface Rs is formed, namely, a light flux having wavelength λ1 which has passed the ring-shaped zonal optical surface Rs is converged on an information recording surface of the first optical information recording medium, to be substantially free from any aberrations.

On the other hand, within a numerical aperture corresponding to the place where ring-shaped zonal optical surface R1 is formed, spherical aberrations become discontinuous toward the "under" side.

It is relatively easy to design forms of S1 surface and S2 surface so that spherical aberrations may be within a range of no trouble in practical use when the total area corresponding to numerical aperture NA1 is considered.

As shown in FIG. 10 (b), with respect to a light flux having wavelength λ2 used for DVD, its spherical aberration is not changed within a numerical aperture corresponding to the place where ring-shaped zonal optical surface Rs is formed, namely, a light flux having wavelength λ2 which has passed the ring-shaped zonal optical surface Rs is converged on an information recording surface of the second optical information recording medium, to be substantially free from any aberrations.

On the other hand, within a numerical aperture corresponding to the place where ring-shaped zonal optical surface R1 is formed, spherical aberrations become discontinuous toward the "under" side.

It is relatively easy to design forms of S1 surface and S2 surface so that spherical aberrations may be within a range of no trouble in practical use when the total area corresponding to numerical aperture NA2 is considered.

In this case, a vertical spherical aberration diagram of a light flux with wavelength λ3 used for CD shown in FIG. 10 (c) is the same as that shown in the FIG. 6(c).

The objective optical element shown in the present embodiment and the optical pickup device employing the objective optical element make it possible to have compatibility for three types of optical information recording media.

Sixteenth Embodiment

Figure 11:
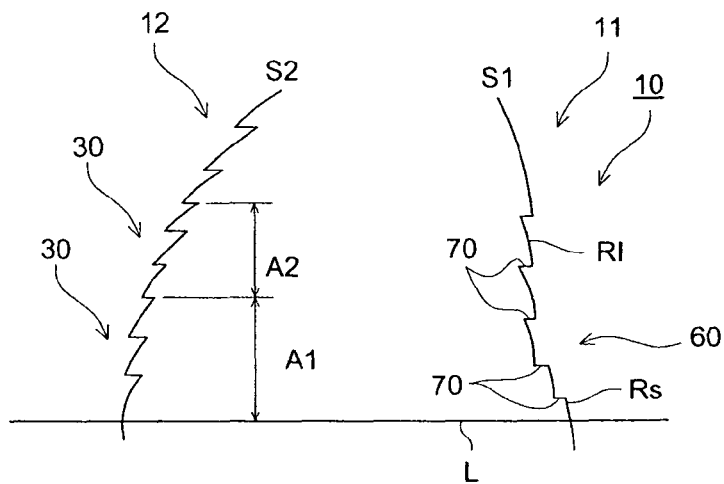
FIG. 11 is a vertical sectional view of primary portions showing the structure of an objective optical element.

The objective optical element shown in the present example is one optical surface 11 (plane of emergence) of the objective optical element, as shown in FIG. 11, and it is different from the Seventh Embodiment in terms of the point that a plurality of ring-shaped zonal optical surfaces 60 whose centers are on the optical axis are formed on an area through which the light flux with wavelength $\lambda 3$ that forms a converged-light spot having numerical aperture NA3 on an information recording surface of CD representing the third optical information recording medium passes, and of the point that a diffracting ring-shaped zone representing first diffractive structure 30 is formed on each of area A1 and area A2 on plane of incidence 12.

To be concrete in explanation, a plurality of ring-shaped zonal optical surfaces 60 whose centers are on the optical axis are formed stepwise continuously through stepped surface 70.

Among light fluxes having respectively wavelengths $\lambda 1$, $\lambda 2$ and $\lambda 3$, a light flux with wavelength $\lambda 3$ is given a prescribed optical path difference when that light flux passes through each ring-shaped zonal optical surface 60 so that a phase difference may be generated before and after the passing, while, at least one of the light fluxes having respectively wavelengths $\lambda 1$ and $\lambda 2$ (both of them in the present embodiment) is not given a prescribed optical path difference when that it passes through each ring-shaped zonal optical surface 60 so that a phase difference may not be generated before and after the passing.

Now, let it be assumed that Rs represents a ring-shaped zonal optical surface including optical axis L and R1 represents a ring-shaped zonal optical surface that is farthest from the optical axis, among two ring-shaped zonal optical surfaces.

The ring-shaped zonal optical surface Rs is composed of a refracting interface, and light fluxes having respectively wavelengths $\lambda 1$, $\lambda 2$ and $\lambda 3$ which have passed through the ring-shaped zonal optical surface Rs form converged-light spots respectively on information recording surfaces of optical information recording media ("high density optical disk", DVD and CD).

The ring-shaped zonal optical surface R1 is also composed of a refracting interface, and a light flux having wavelength $\lambda 3$ which has passed through the ring-shaped zonal optical surface R1 also forms a converged-light spot on an information recording surfaces of the third optical information recording medium.

Figure 12:
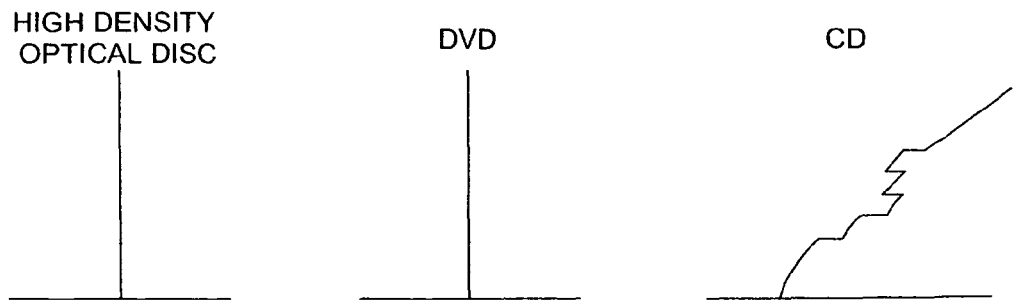
FIG. 12(*a*) to (*c*) each shows a vertical spherical aberration diagram.

FIG. 12 shows an example of a vertical spherical aberration diagram on each information recording surface of the high density disc, DVD and CD.

As shown in FIG. 12 (a), with respect to a light flux having wavelength $\lambda 1$ used for a high density optical disk, its spherical aberration is not changed within a numerical aperture corresponding to the place where ring-shaped zonal optical surface Rs is formed, namely, a light flux having wavelength $\lambda 1$ which has passed the ring-shaped zonal optical surface Rs is converged on an information recording surface of the first optical information recording medium, to be substantially free from any aberrations.

Further, the spherical aberration is not changed even at the numerical aperture corresponding to the place where ring-shaped zonal optical surface R1 is formed, namely, a light flux having wavelength $\lambda 1$ which has passed the ring-shaped zonal optical surface R1 is converged on an information recording surface of the first optical information recording medium, to be substantially free from any aberrations.

Therefore, it is possible to make spherical aberrations to be almost zero when the total area corresponding to numerical aperture NA1 is considered.

Incidentally, according to circumstances, microscopic deviation of a light-converging position by the light flux that has passed each ring-shaped zonal optical surface such as that shown in FIG. 12 (c) may appear in FIGS. 12 (a) and 12 (b), depending on the ring-shaped zonal structure on surface S1. In this case, however, vertical spherical aberration diagrams which are completely free from aberrations schematically are shown here.

Further, as shown in FIG. 12 (b), with respect to a light flux having wavelength $\lambda 2$ used for DVD, its spherical aberration is not changed within a numerical aperture corresponding to the place where ring-shaped zonal optical surface Rs is formed, namely, a light flux having wavelength $\lambda 2$ which has passed the ring-shaped zonal optical surface Rs is converged on an information recording surface of the second optical information recording medium, to be substantially free from any aberrations.

Further, the spherical aberration is not changed even within the numerical aperture corresponding to the place where ring-shaped zonal optical surface R1 is formed, namely, a light flux having wavelength $\lambda 2$ which has passed the ring-shaped zonal optical surface R1 is converged on an information recording surface of the second optical information recording medium, to be substantially free from any aberrations.

Therefore, it is possible to make spherical aberrations to be almost zero when the total area corresponding to numerical aperture NA2 is considered.

Further, as shown in FIG. 12 (c), with respect to a light flux having wavelength $\lambda 3$ used for CD, its spherical aberration grows greater gradually toward the "over" side within a numerical aperture corresponding to the place where ring-shaped zonal optical surface Rs is formed.

On the other hand, within a numerical aperture corresponding to the place where ring-shaped zonal optical surface R1 is formed, spherical aberrations become discontinuous toward the "under" side.

It is relatively easy to design forms of S1 surface and S2 surface so that spherical aberrations may be within a range of no trouble in practical use when the total area corresponding to numerical aperture NA3 is considered. Incidentally, a light flux having wavelength $\lambda 3$ which has passed the position which is farther from the optical axis than the place where the ring-shaped zonal optical surface R1 is formed is, becomes a flare.

Therefore, it is not necessary to provide a separate diaphragm for the light flux having wavelength $\lambda 3$.

As stated above, an objective optical element shown in the present embodiment and an optical pickup device employing the objective optical element make it possible to achieve compatibility for three types of optical information recording media.

Figure 13:
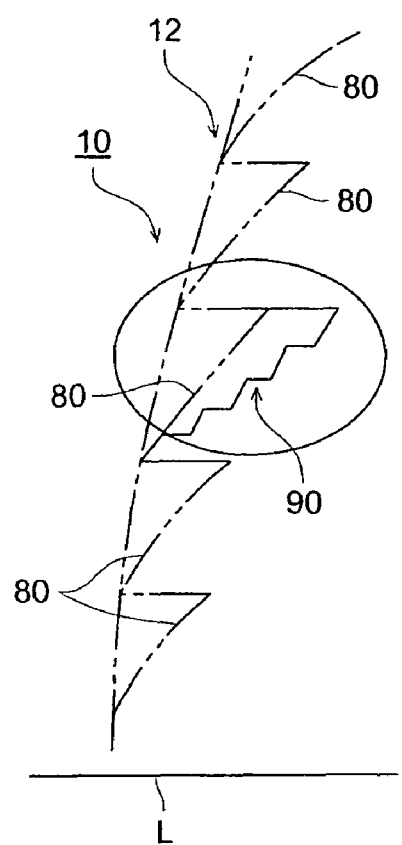
FIG. 13 (*a*) and FIG. 13 (*b*) each shows a sectional view of an objective lens.
Figure 13:
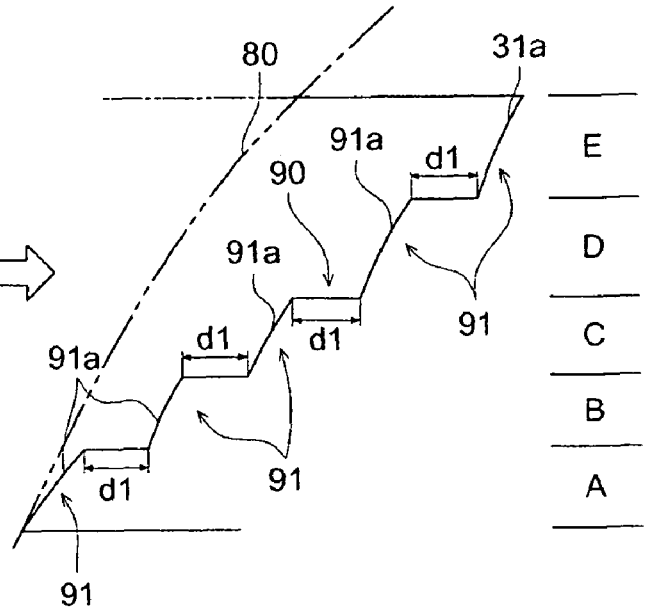

Further, optical path difference furnishing structure 90 and diffracting ring-shaped zones 80 which are shown respectively in FIG. 13 (a) and FIG. 13 (b) may also be formed on optical surface 12 on one side of objective lens 10.

To be concrete, on the objective lens 10, there are formed a plurality of diffracting ring-shaped zones 80 representing a serrated discontinuous surface having a substantial inclination for the prescribed aspheric-shaped optical surface having its center on optical axis L, and further, on the optical surface of each diffracting ring-shaped zone 80, there is formed optical path difference furnishing structure 90 composed of staircase-shaped discontinuous surfaces (steps) 91 in the direction of an optical axis which furnish a prescribed optical path difference to the light flux that passes through the diffracting ring-shaped zones 80.

One-dot-chain lines in FIGS. 13 (*a*) and 13 (*b*) indicate an optical surface (optical surface in a shape of a prescribed aspheric surface) which is in a form of an imaginary aspheric surface obtained by connecting vertexes of diffracting ring-shaped zones 80 as stated above, while, two-dot-chain lines indicate an outer form of the known serrated diffracting ring-shaped zones 80 in a shape of concentric circles which are formed in a way that a thickness is increased gradually as a position for the thickness recedes from optical axis L which serves as the center.

Solid lines indicate a form of the actual lens including an outer form of step 91 that is formed on an optical surface of the diffracting ring-shaped zones 80 and furnishes a prescribed optical path difference to the light flux passing through each diffracting ring-shaped zones 80.

Depth d1 of the step 91 (length in the direction of optical axis L) is nearly the same as a value expressed by $\lambda 2/(n-1)$ when n represents the refractive index of the objective lens for wavelength $\lambda 2$, for example, and it is established to be in the length wherein an optical path difference equivalent substantially to one wavelength $\lambda 2$ is generated between a light flux with wavelength $\lambda 2$ passing through one step and a light flux with wavelength $\lambda 2$ passing through the adjoining step, and no slippage of a wave front is caused.

Further, a form of surface 91*a* (optical functional surface) of each step approximates a form wherein a form of the surface of serrated diffracting ring-shaped zones 80 shown with two-dot chain lines in the diagram is split by sections corresponding to each step 91 to be moved in parallel in the direction of optical axis L.

As stated above, owing to the optical path difference furnishing structure 90 that is equipped on its optical surface with step 91 having a prescribed depth, there is given a function to furnish a prescribed optical path difference to a light flux passing through objective lens 10, and owing to the form of surface 91*a* of each step wherein diffracting ring-shaped zones 80 is split by sections corresponding to step 91 to be moved in parallel in the direction of optical axis L, there is given a function to extract diffracted light of the diffraction order that causes the maximum diffraction efficiency for light fluxes having respectively wavelengths $\lambda 1$-$\lambda 3$.

For example, when the light flux with wavelength $\lambda 1$ (650 nm) enters an objective lens, the light flux with wavelength $\lambda 1$ is subjected to diffraction effect by the diffracting ring-shaped zones 80, and each light flux is substantially given a phase difference of 780 nm−650 nm=130 nm, namely of $\frac{2}{5}\pi$ radian, after passing through areas A-E in FIG. 13 (*b*), resulting in receiving of diffraction effect caused by changes of a phase of the light flux with wavelength $\lambda 1$.

On the other hand, when the light flux with wavelength $\lambda 2$ (780 nm) enters, the light flux with wavelength $\lambda 2$ is subjected to diffraction effect by the diffracting ring-shaped zones 80, and each light flux is given a phase difference corresponding to one wavelength $\lambda 2$ after passing through areas A-E in FIG. 5, and a phase difference caused between light fluxes passing through areas A-E becomes almost zero. Therefore, the light flux with wavelength $\lambda 2$ is not diffracted substantially by the optical path difference furnishing structure 90 to be transmitted as it is.

Since the diffraction order of a light flux with each wavelength can be changed substantially by two steps of the diffracting ring-shaped zones 80 and the optical path difference furnishing structure 90, it is possible to obtain diffracted light having a sufficient amount of light corresponding to the types of optical information recording media, by changing the diffraction order of each light flux according to circumstances. It is also possible to increase the degree of freedom for design for diffraction efficiency and the diffraction order.

EXAMPLE

Next, the first example of the optical pickup device and the optical element shown in the aforementioned embodiment will be explained.

In the present example, let it be assumed to use an objective lens wherein surface S1 and surface S2 are combined on the plane of incidence side such as that shown in FIG. 8.

Figure 14:
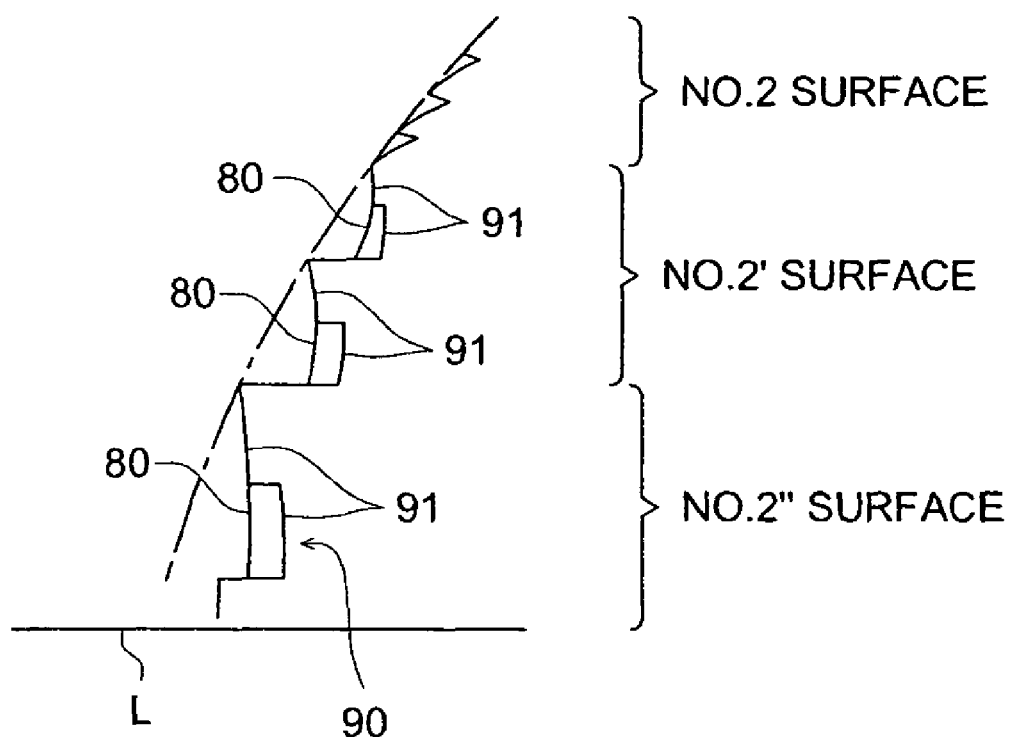
FIG. 14 shows a sectional view of an objective lens.

To be concrete in explanation, a plane of incidence of an objective lens representing a single and two-sided aspheric lens is divided into No. 2 surface whose height h from optical axis L is 1.45 mm or more, No. 2' surface whose height is not less than 1.1 mm and is less than 1.45 mm and No. 2" whose height is less than 1.1 mm, as shown in FIG. 14.

On No. 2' surface and No. 2" surface, there are formed plural serrated and discontinuous diffracting ring-shaped zones 80 having substantial inclination for an optical surface in a form of a prescribed aspheric surface, and on the optical surface of each diffracting ring-shaped zone 80, there is formed optical path difference furnishing structure 90 that gives a prescribed optical path difference to a light flux passing through the diffracting ring-shaped zones 80 and is composed of staircase-shaped discontinuous surfaces (steps) 91 in the direction of an optical axis, and each step 91 formed on one diffracting ring-shaped zone 80 is in a shape that is more protruded toward the light source side as a position of the shape recedes from optical axis L.

On the No. 2 surface, there are formed only serrated ring-shaped zones.

Then, light fluxes having respectively wavelengths $\lambda 1$, $\lambda 2$ and $\lambda 3$ which pass through No. 2' surface and No. 2" surface emerge after being subjected to diffracting effect by the aforementioned diffracting ring-shaped zone 80 and the optical path difference furnishing structure 90 so that diffracted light with diffraction order m=2, n=1 and k=0 which make the diffraction efficiency to be maximum.

To be concrete in explanation, under the assumption that no optical path difference furnishing structure 90 is provided, the optical surface of the diffracting ring-shaped zone 80 diffracts so that second (=mB1) order diffracted light of the light flux with wavelength $\lambda 1$ may have the maximum diffraction efficiency, first (=mB2) order diffracted light of the light flux with wavelength $\lambda 2$ may have the maximum diffraction efficiency, and first (=mB3) order diffracted light of the light flux with wavelength $\lambda 3$ may have the maximum diffraction efficiency.

Further, the optical path difference furnishing structure 90 gives to these diffracted light an optical path difference by which the second (=m) order diffracted light of the light flux with wavelength $\lambda 1$ has the maximum diffraction efficiency, an optical path difference by which the first (=n) order diffracted light of the light flux with wavelength $\lambda 2$ has the maximum diffraction efficiency, and an optical path difference by which the $0^{th}$ (=k) order diffracted light of the light flux with wavelength $\lambda 3$ has the maximum diffraction efficiency.

In other words, an optical path difference is given to each light flux so that the following expressions are satisfied, $$m=2-0=2$$

$$n=1-0+0=1$$

$$k=1-0-1=0$$

under the assumption that mB1=2, mB2=1, mB3=1 and mD=0, in the following expressions (1)-(3).

$$m = mB1 - mD \quad (1)$$

$$n = mB2 - mD + (-1, 0 \text{ or } 1) \quad (2)$$

$$k = mB3 - mD + (-1, 0 \text{ or } 1) \quad (3)$$

Further, light fluxes having respectively wavelengths λ1, λ2 and λ3 which pass through No. 2 surface emerge after being subjected to diffracting effect by the aforementioned diffracting ring-shaped zone 80 so that diffracted light with m=2, n=1 and k=1 may be obtained.

As stated above, for light fluxes having respectively wavelengths λ1 and λ2, diffracting effects are given to them when they pass respectively through No. 2 surface, No. 2' surface and No. 2" surface so that diffracted light with diffraction orders m=2 and n=1 may be obtained, while, for light flux with wavelength λ3, diffracting effects are given to it so that diffracted light with different diffraction orders may be obtained when the light flux passes through No. 2' surface and No. 2" surface and when the light flux passes through No. 2 surface, thus, it is possible to make the light flux (first order diffracted light) having wavelength λ3 that has passed through No. 2 surface to be a flare without making the light flux to be converged on an information recording surface of CD.

Lens data of the objective lens are shown in Table 1 and Table 2.

As is shown in Table 1, the objective lens of the present example is set to focal length f=3.1 mm and image-side numerical aperture NA1=0.65 for wavelength λ1=407 nm, to focal length f2=3.26 mm and image-side numerical aperture NA2=0.62 for wavelength λ2=655 nm and to focal length f3=3.57 mm and image-side numerical aperture NA3=0.40 for wavelength λ3=785 nm.

Further, magnifications m1-m3 respectively for light fluxes with λ1-λ3 are almost zero, which constitutes the structure of an infinite system wherein parallel light enters the objective lens.

Surface No. 2, 2' and 2" in Table 1 show respectively No. 2 surface of 1.45 mm≦h, No. 2' surface of 1.1 mm≦h<1.45 mm and No. 2" surface of h<1.1 mm among planes of incidence of the objective lens, and Surface No. 3 and 4 show respectively a surface of a protective substrate and a recording layer of the optical information recording medium. Further, Ri represents a radius of curvature, di represents a displacement from the surface i to the surface i+1 in the direction of an optical axis and ni represents a refractive index of each surface.

No. 2 surface, No. 2' surface, No. 2" surface and No. 3 surface of the objective lens are formed to be aspheric surfaces which are prescribed by the expression wherein coefficients shown in Table 1 and Table 2 are substituted in the following expression (Numeral 1) and are around optical axis L to be symmetrical with respect to the axis.

(Numeral 1)

Aspherical configuration formula $$X(h) = \frac{(h^2/R)}{1 + \sqrt{1 - (1+\kappa)(h/R)^2}} + \sum_{i=0}^{9} A_{2i} h^{2i}$$

TABLE 1

| Example 1 lens data | | | |
|---|---|---|---|
| Focal length of objective lens | f1: 3.1 mm | f2: 3.26 mm | f3: 3.57 mm |
| Image side numerical aperture | NA1: 0.65 | NA2: 0.62 | NA3: 0.40 |
| Diffraction order | n1: 0 | n2: 1 | n3: 0 |
| Magnification | m1: 0 | m2: 0 | m3: 0 |

| i-th surface | Ri | di (407 nm) | ni (407 nm) | di (655 nm) | ni (655 nm) | di (785 nm) | ni (785 nm) |
|---|---|---|---|---|---|---|---|
| 0 | | ∞ | | ∞ | | ∞ | |
| 1 (aperture diameter) | ∞ | 0.1 (Φ4.03 mm) | | 0.1 (Φ4.03 mm) | | 0.1 (Φ2.89 mm) | |
| 2 | 2.05949 | −0.004843 | 1.559806 | −0.004843 | 1.540725 | −0.004843 | 1.537237 |
| 2' | 1.65821 | −0.025414 | | −0.025414 | | −0.025414 | |
| 2" | 2.11730 | 1.730000 | | 1.730000 | | 1.730000 | |
| 3 | −14.46196 | 1.71 | | 1.85 | 1.0 | 1.79 | 1.0 |
| 4 | ∞ | 0.60 | 1.0 | 0.60 | 1.57752 | 1.20 | 1.57063 |
| 5 | ∞ | | 1.61869 | | | | |

* di represents a displacement from i-th surface to (i + 1)-th surface. (provided that, d2, d2' represents a displacement up to 2"-th surface)

In the expression, X (h) represents an axis in the direction of an optical axis (the direction of travel is positive), κ represents the constant of the cone and $A_{2i}$ represents an aspheric surface coefficient.

TABLE 2

Aspherical surface data

Second surface (1.45 mm ≦ h)

| | | |
|---|---|---|
| Aspherical surface coefficient | κ | −4.8542 × E−1 |
| | A4 | −2.9942 × E−3 |
| | A6 | −9.4811 × E−5 |
| | A8 | +4.4741 × E−4 |
| | A10 | −1.2388 × E−4 |
| | A12 | −1.2201 × E−5 |
| | A14 | −7.2281 × E−7 |
| Optical path difference function | C2 | −1.9949 × E+1 |
| | C4 | −8.1237 × E−1 |
| | C6 | +5.6955 × E−1 |
| | C8 | −1.6478 × E−1 |
| | C10 | +1.8361 × E−2 |

2'-th surface (1.1 mm ≦ h < 1.45 mm)

| | | |
|---|---|---|
| Aspherical surface coefficient | κ | −1.8050 |
| | A4 | −2.3866 × E−2 |
| | A6 | +4.9979 × E−3 |
| | A8 | +7.6653 × E−3 |
| | A10 | −1.6235 × E−4 |
| | A12 | −1.9529 × E−3 |
| | A14 | +4.6746 × E−4 |
| Optical path difference function | C2 | −1.9615 × E+1 |
| | C4 | −3.4498 × E−1 |
| | C6 | −6.7775 × E−1 |
| | C8 | +6.2791 × E−1 |
| | C10 | −1.5009 × E−1 |

Ssecond surface (h < 1.1 mm)

| | | |
|---|---|---|
| Aspherical surface coefficient | κ | −5.6043 × E−1 |
| | A4 | −1.2469 × E−2 |
| | A6 | −3.4236 × E−3 |
| | A8 | −1.3601 × E−3 |
| | A10 | +1.4240 × E−5 |
| | A12 | +1.7673 × E−5 |
| | A14 | −1.2485 × E−6 |
| Optical path difference function | C2 | −1.9785 × E+1 |
| | C4 | −9.7147 × E−1 |
| | C6 | +1.6560 |
| | C8 | −1.6829 |
| | C10 | −5.9962 × E−1 |

Third surface

| | | |
|---|---|---|
| Aspherical surface coefficient | κ | −7.3166 × E+2 |
| | A4 | −1.2546 × E−2 |
| | A6 | +1.1479 × E−2 |
| | A8 | −5.0025 × E−3 |
| | A10 | −1.2263 × E−3 |
| | A12 | −1.6898 × E−4 |
| | A14 | +1.0226 × E−5 |

Further, a pitch of the ring-shaped zones is prescribed by the expression wherein a coefficient shown in Table 2 is substituted for the optical path difference function of Numeral 2.

(Numeral 2)

Optical path difference function $$\phi_{(b)} = \left( \sum_{i=0}^{5} B_{2i} h^{2i} \right) \times m_D \times \frac{\lambda}{\lambda_B}$$

$m_D$: Diffraction order in the case that there is not provided a optical path difference providing structure.

λ: used wavelength $\lambda_B$: blazing wavelength for diffraction ($\lambda_B$=1 mm in the example)

In the expression, $B_{2i}$ represents a coefficient of the optical path difference function.

Figure 15:
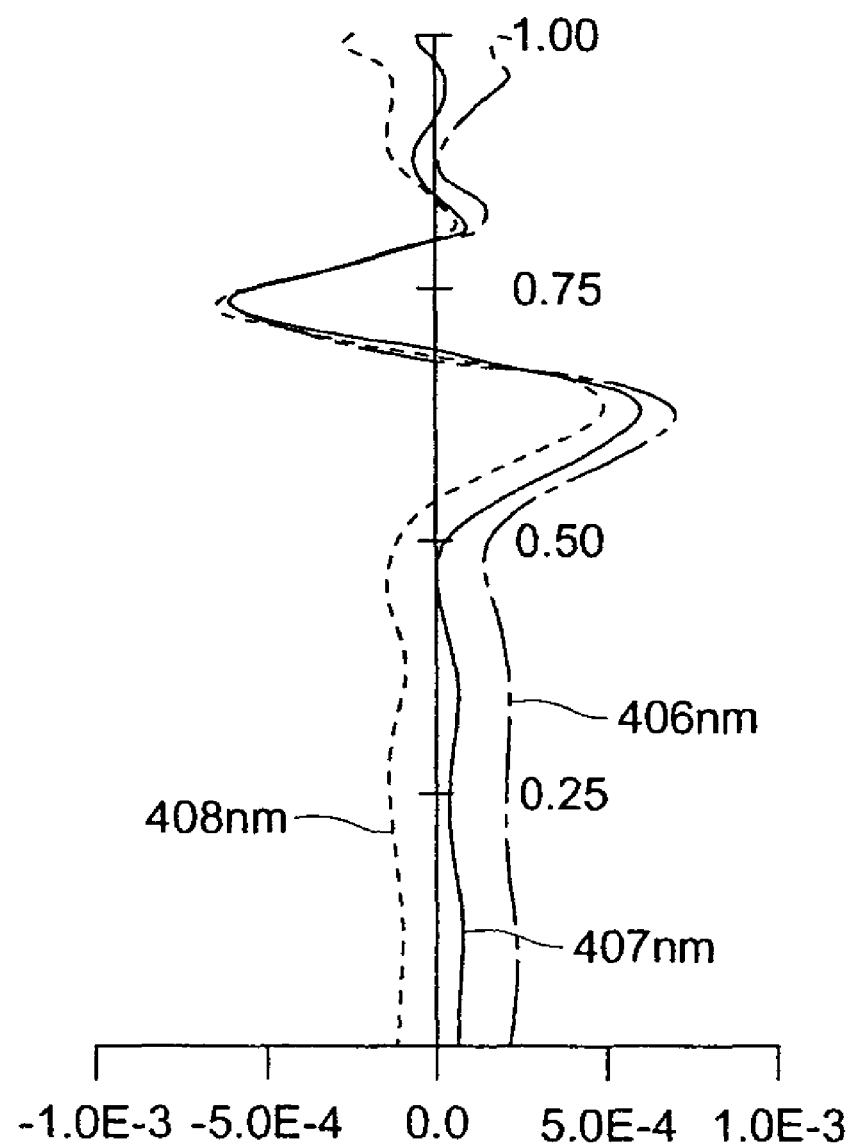
FIG. 15 is a graph showing an amount of fluctuation of vertical spherical aberration.

FIG. 15 is a graph showing an amount of fluctuation of vertical spherical aberration and a numerical aperture (NA) in the occasion where a wavelength of a light flux having wavelength λ1 (407 nm) used for a high density disc (AOD) fluctuates by ±1 nm from 407 nm.

Since the amount of fluctuation of a wavelength caused by mode-hop or the like is about 1 μm as a rule, it is understood that an amount of fluctuation of vertical spherical aberration is kept within a range of no trouble in practical use with the aforementioned range, and a sufficient function to correct chromatic aberrations is provided.

Figure 17:
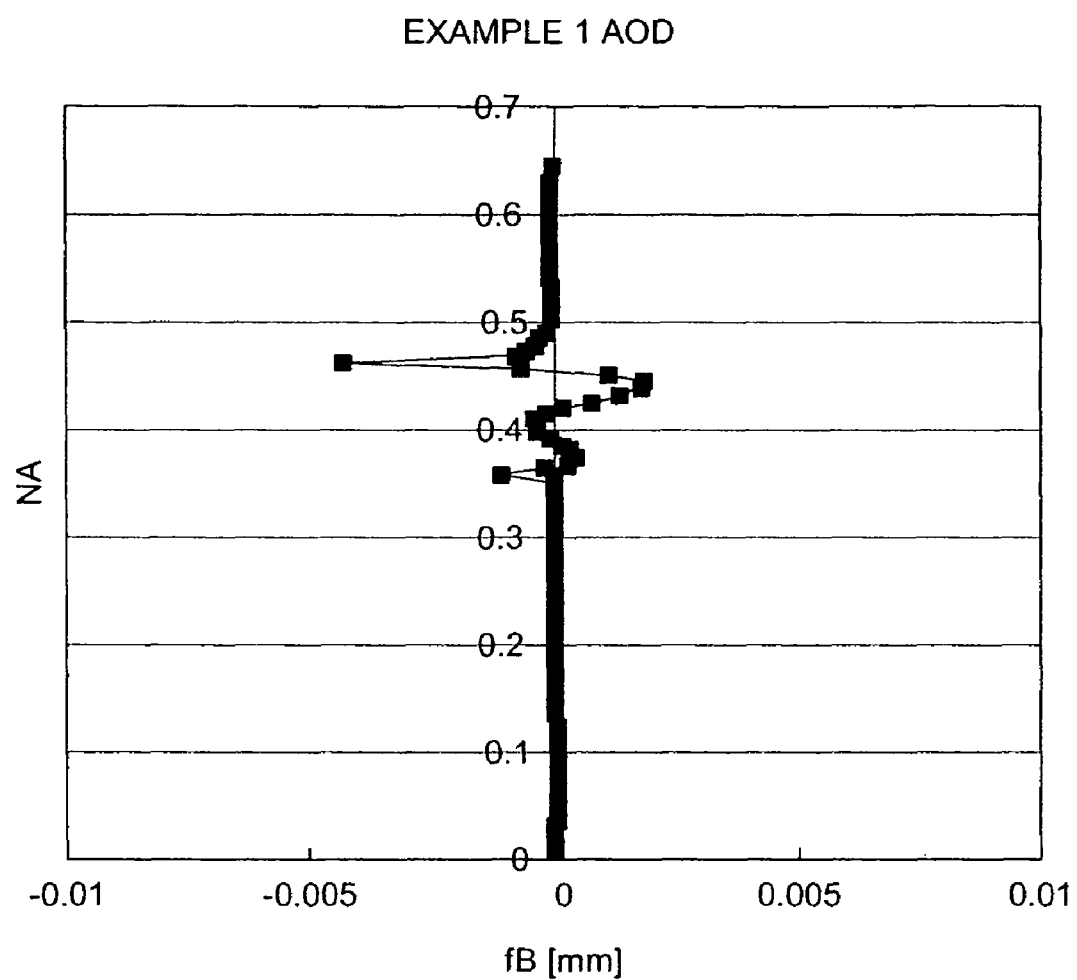
FIG. 17 shows a graph showing a light-converged position fB and a numerical aperture on AOD in Example 1.
Figure 18:
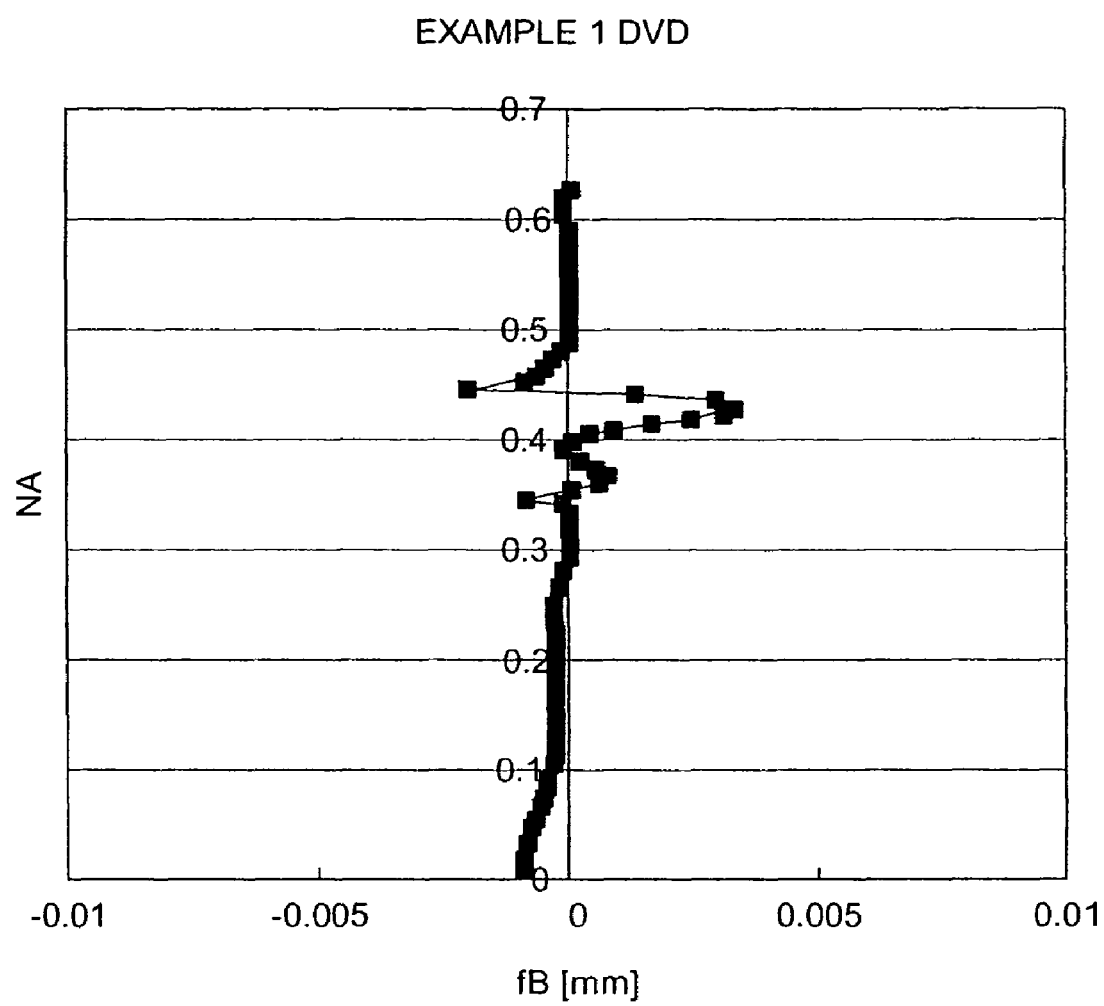
FIG. 18 shows a graph showing a light-converged position fB and a numerical aperture on DVD in Example 1.
Figure 19:
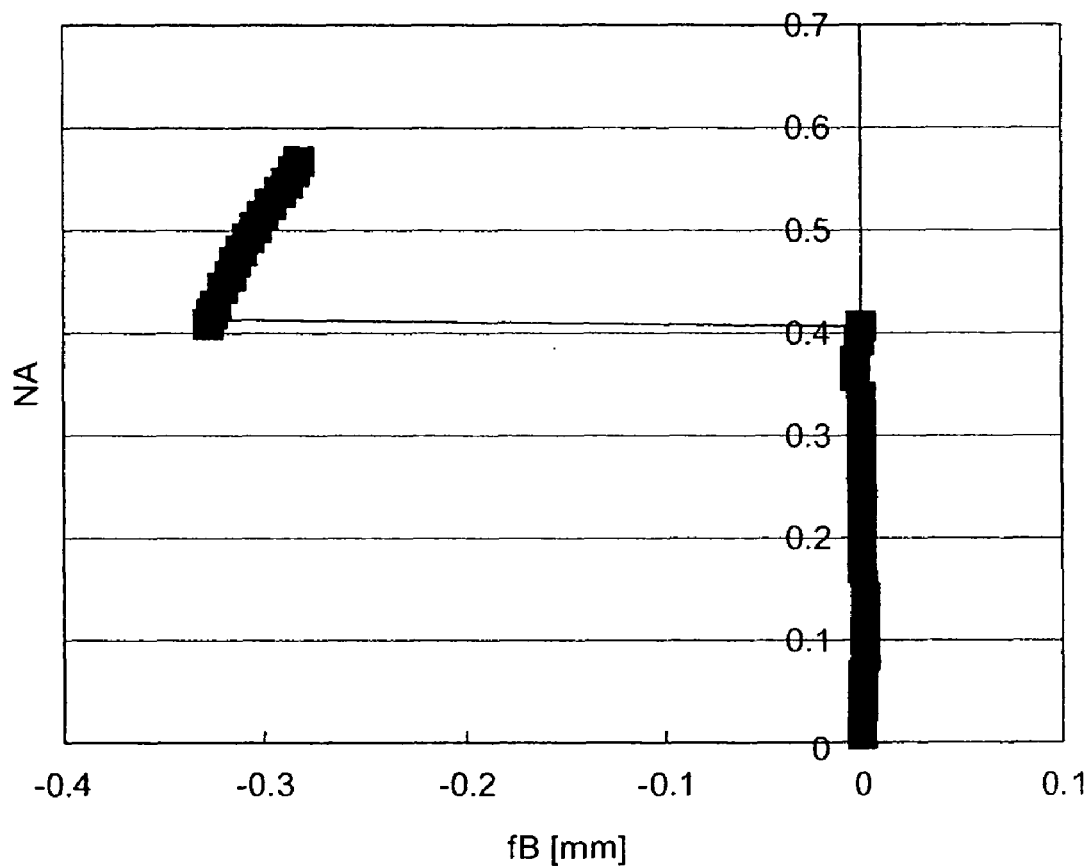
FIG. 19 shows a graph showing a light-converged position fB and a numerical aperture on CD in Example 1.

FIG. 16 shows wave-front aberration and diffraction efficiency for each of light fluxes having respectively wavelengths λ1 (AOD), λ2 (DVD) and λ3 (CD), and FIG. 17-FIG. 19 show graphs each showing light-converged position fB and a numerical aperture of each of light fluxes having respectively wavelengths λ1-λ3.

From FIG. 16-FIG. 19, it is understood that wave-front aberration of each light flux is kept to a diffraction limit of 0.07 λrms or less and a sufficient function to correct chromatic aberrations is provided. It is further understood that a sufficient diffraction efficiency is provided to be used for recording and/or reproducing information for each optical information recording medium.

Next, there will be explained Second Example for the optical pickup device and the optical element shown in the aforementioned embodiment.

In the present example again, let it be assumed that an objective lens wherein surface S1 and surface S2 are combined on the plane of incidence side like that shown in FIG. 8 is used.

To be concrete in explanation, a plane of incidence of an objective lens representing a single and two-sided aspheric lens is divided into No. 2 surface whose height h from optical axis L is 1.45 mm or more, No. 2' surface whose height is not less than 1.1 mm and is less than 1.45 mm and No. 2" whose height is less than 1.1 mm (area A2).

On area A1, there are formed a plurality of ring-shaped zones as the first diffractive structure, and on area A2, there are formed ring-shaped zones as the second diffractive structure. The ring-shaped zones are formed also on No. 2 surface.

Light fluxes having respectively wavelengths λ1, λ2 and λ3 which respectively pass No. 2 surface, No. 2' surface and No. 2" surface are subjected by the first and second diffractive structures to diffraction effects to emerge, so that diffracted light respectively with diffraction orders m=3, n=2 and k=2 for the maximum diffraction efficiency may be obtained.

Lens data of the objective lens are shown in Table 3 and Table 4.

TABLE 3

Example 2 lens data

| | | | | | | |
|---|---|---|---|---|---|---|
| Focal length of objective lens | | f1: 3.1 mm | | f2: 3.19 mm | | f3: 3.18 mm |
| Image side numerical aperture | | NA1: 0.65 | | NA2: 0.63 | | NA3: 0.45 |
| Diffraction order | | n1: 3 | | n2: 2 | | n3: 2 |
| Magnification | | m1: 0 | | m2: 0 | | m3: 0 |

| i-th surface | Ri | di (407 nm) | ni (407 nm) | di (655 nm) | ni (655 nm) | di (785 nm) | ni (785 nm) |
|---|---|---|---|---|---|---|---|
| 0 | | ∞ | | ∞ | | ∞ | |
| 1 (aperture diameter) | ∞ | 0.1 (Φ4.03 mm) | | 0.1 (Φ4.03 mm) | | 0.1 (Φ2.89 mm) | |
| 2 | 2.04672 | 0.005188 | 1.559806 | 0.005188 | 1.540725 | 0.005188 | 1.537237 |
| 2' | 2.19683 | 0.013857 | | 0.013857 | | 0.013857 | |
| 2" | 1.99496 | 1.730000 | | 1.730000 | | 1.730000 | |
| 3 | −13.44828 | 1.72 | | 1.78 | 1.0 | 1.38 | 1.0 |
| 4 | ∞ | 0.60 | 1.0 | 0.60 | 1.57752 | 1.20 | 1.57063 |
| 5 | ∞ | | 1.61869 | | | | |

* di represents a displacement from i-th surface to (i + 1)-th surface. (provided that, d2, d2' represents a displacement up to 2"-th surface)

As is shown in Table 3, the objective lens of the present example is set to focal length f1=3.1 mm and image-side numerical aperture NA1=0.65 for wavelength λ1=407 nm, to focal length f2=3.19 mm and image-side numerical aperture NA2=0.63 for wavelength λ2=655 nm and to focal length f3=3.18 mm and image-side numerical aperture NA3=0.45 for wavelength λ3=785 nm.

Further, magnifications m1-m3 respectively for light fluxes with λ1-λ3 are almost zero, which constitutes the structure of an infinite system wherein parallel light enters the objective lens.

No. 2 surface, No. 2' surface, No. 2" surface and No. 3 surface of the objective lens are formed to be aspheric surfaces which are prescribed by the expression wherein coefficients shown in Table 3 and Table 4 are substituted in the Numeral 1 and are around optical axis L to be symmetrical with respect to the axis.

TABLE 4

Aspherical surface data

| | | |
|---|---|---|
| Second surface(1.45 mm ≦ h) | | |
| Aspherical surface coefficient | κ | −5.4210 × E−1 |
| | A4 | −1.6156 × E−3 |
| | A6 | +5.2867 × E−4 |
| | A8 | +4.5232 × E−4 |
| | A10 | −1.9450 × E−4 |
| | A12 | −1.9945 × E−5 |
| | A14 | −8.1755 × E−7 |
| Optical path difference function | C2 | −5.6884 |
| | C4 | −2.3034 |
| | C6 | +5.8398 × E−1 |
| | C8 | −1.1111 × E−1 |
| | C10 | +5.2102 × E−3 |
| 2'-th surface(1.1 mm ≦ h < 1.45 mm) | | |
| Aspherical surface coefficient | κ | −3.7554 × E−1 |
| | A4 | −7.9273 × E−3 |
| | A6 | +2.1214 × E−2 |
| | A8 | −3.0263 × E−3 |
| | A10 | −9.9477 × E−3 |
| | A12 | +5.9443 × E−3 |
| | A14 | −1.0283 × E−3 |
| Optical path difference function | C2 | −5.5699 |
| | C4 | −2.5038 |
| | C6 | −7.8130 × E−2 |
| | C8 | +5.7889 × E−1 |

TABLE 4-continued

Aspherical surface data

| | | |
|---|---|---|
| | C10 | −2.0441 × E−1 |
| Second surface(h < 1.1 mm) | | |
| Aspherical surface coefficient | κ | +6.8230 × E−1 |
| | A4 | −3.5343 × E−2 |
| | A6 | +2.8071 × E−2 |
| | A8 | −3.4333 × E−2 |
| | A10 | +1.1079 × E−2 |
| | A12 | +1.7674 × E−5 |
| | A14 | −1.2485 × E−6 |
| Optical path difference function | C2 | −5.7100 |
| | C4 | −7.2912 |
| | C6 | +1.5277 × E−1 |
| | C8 | −1.5615 × E−1 |
| | C10 | +5.6948 |
| Third surface | | |
| Aspherical surface coefficient | κ | −1.2944 × E+2 |
| | A4 | −3.6832 × E−3 |
| | A6 | +1.0114 × E−2 |
| | A8 | −5.6473 × E−3 |
| | A10 | +1.4453 × E−3 |
| | A12 | −1.7972 × E−4 |
| | A14 | +8.5800 × E−6 |

Further, a pitch of the ring-shaped zones is prescribed by the expression wherein a coefficient shown in Table 4 is substituted for the optical path difference function of the aforesaid Numeral 2.

Figure 20:
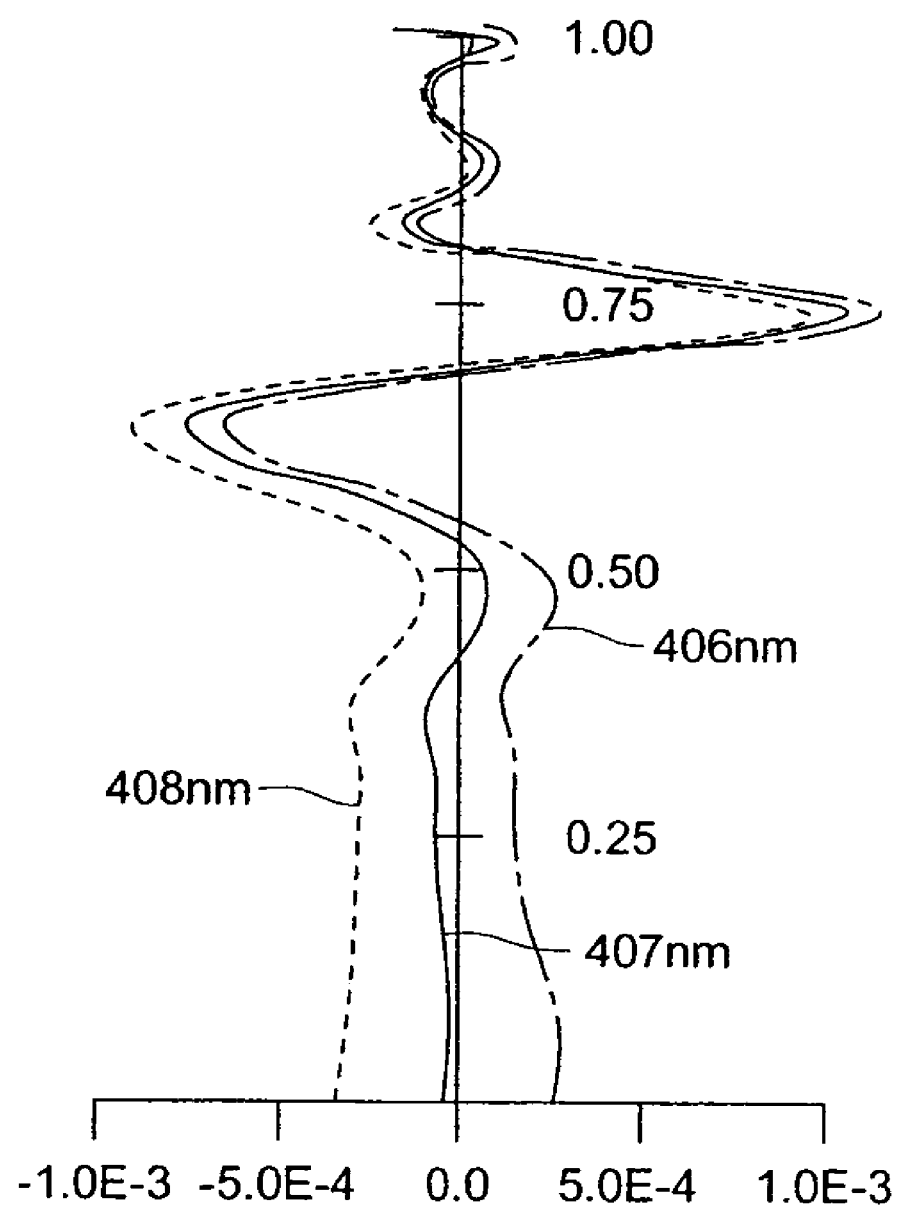
FIG. 20 is a graph showing an amount of fluctuation of vertical spherical aberration.

FIG. 20 is a graph showing an amount of fluctuation of spherical aberration and a numerical aperture (NA) in the occasion where a wavelength of a light flux having wavelength λ1 (407 nm) used for a high density disc (AOD) fluctuates by ±1 nm from 407 nm.

Since the amount of fluctuation of a wavelength caused by mode-hop or the like is about 1 μm as a rule, it is understood that an amount of fluctuation of vertical spherical aberration is kept within a range of no trouble in practical use with the aforementioned range, and a sufficient function to correct chromatic aberrations is provided.

Figure 22:
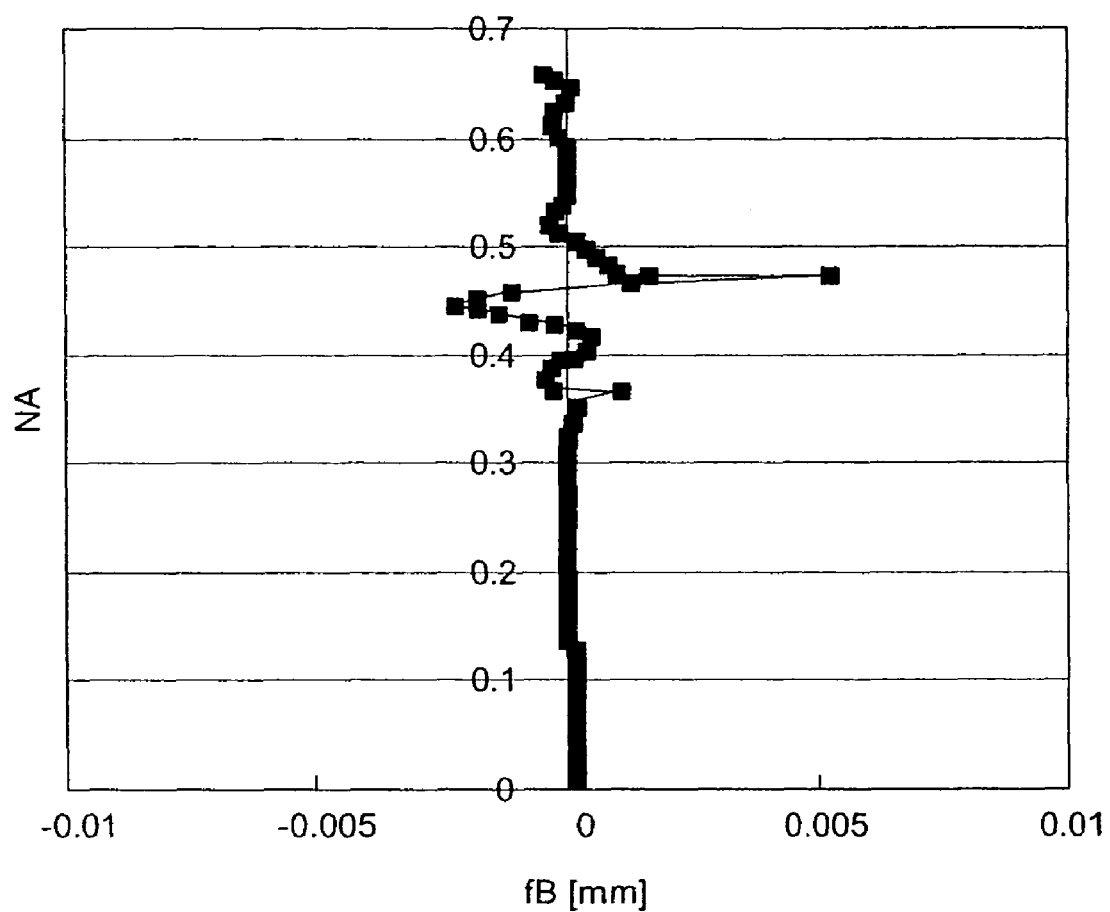
FIG. 22 shows a graph showing a light-converged position fB and a numerical aperture on AOD in Example 2.
Figure 23:
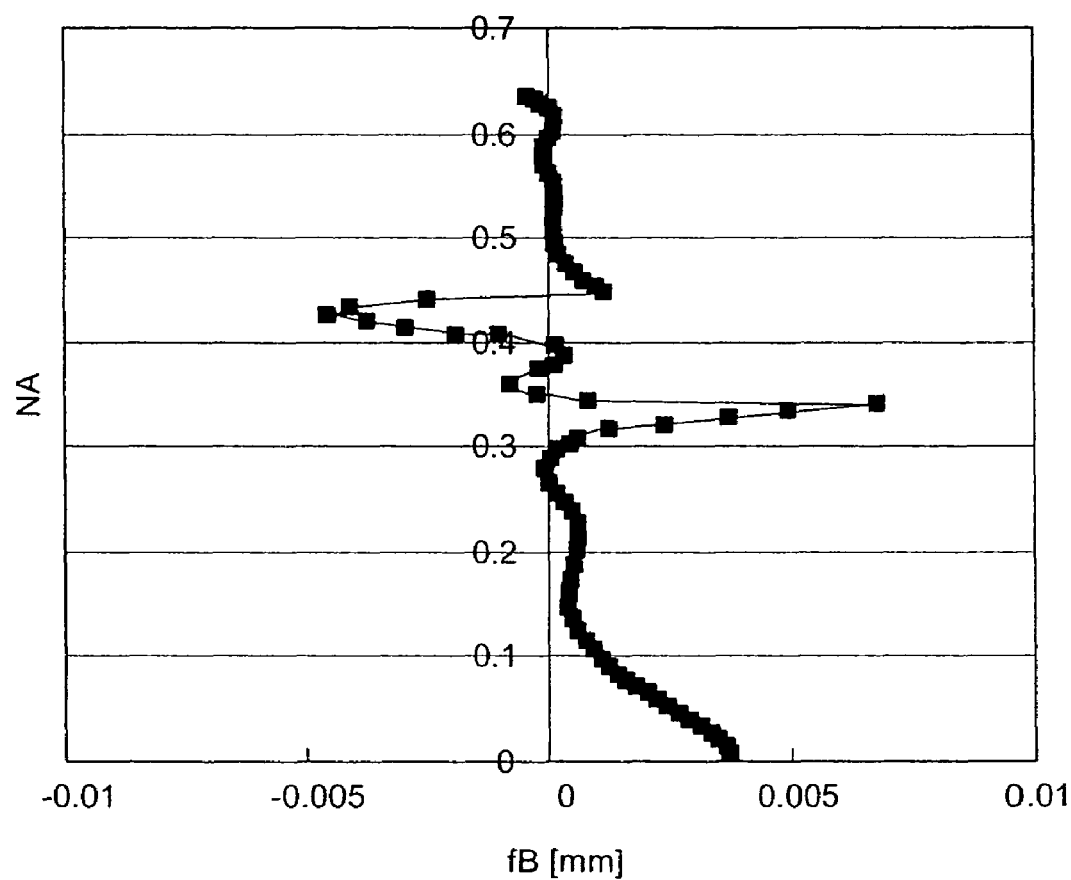
FIG. 23 shows a graph showing a light-converged position fB and a numerical aperture on DVD in Example 2.
Figure 24:
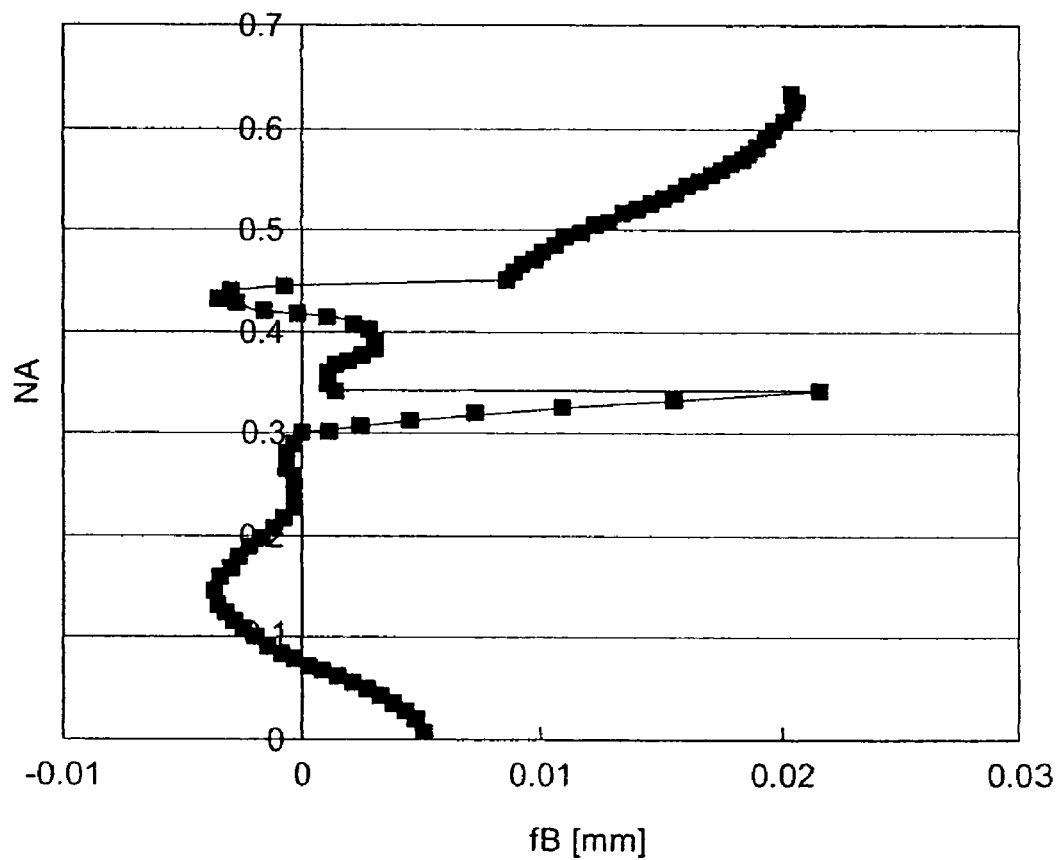
FIG. 24 shows a graph showing a light-converged position fB and a numerical aperture on CD in Example 2.

FIG. 21 shows wave-front aberration and diffraction efficiency for each of light fluxes having respectively wavelengths λ1 (AOD), λ2 (DVD) and λ3 (CD), and FIG. 22-FIG.

24 show graphs each showing light-converged position fB and a numerical aperture of each of light fluxes having respectively wavelengths λ1-λ3.

From FIG. 21-FIG. 24, it is understood that wave-front aberration is kept to a diffraction limit of 0.07 λrms or less and a sufficient function to correct chromatic aberrations is provided. It is further understood that a sufficient diffraction efficiency is provided to be used for recording and/or reproducing information for each optical information recording medium.

In the optical pickup device and the optical element relating to the invention, the optical pickup device is arranged on the common optical path for the first, second and third light sources, and a diffractive optical element having the first diffractive structure is provided, and when conducting reproducing and/or recording of information for the first, second and third optical information recording media, all light fluxes are made to enter the diffracting light optical element at the substantially same angle.

Therefore, the optical paths for light respectively with the first-third wavelengths are mostly the same, thus, various types of optical elements constituting the optical pickup device have only to be arranged to correspond to the common optical path, thereby, the structure of the optical pickup device can be simplified and the number of parts of the device can be reduced.

Further, all the light fluxes are made to enter the diffractive optical element as substantially infinite parallel rays.

Therefore, it is possible to prevent that image height characteristics are worsened in the case of tracking to move an objective optical element for the optical information recording medium, and to inhibit occurrence of various aberrations such as coma and astigmatism.

It is further possible to inhibit spherical aberration caused by temperature changes.

What is claimed is:

1. An optical pickup apparatus, comprising:
    a first light source to emit a light flux of a wavelength λ1 for conducting at least one of recording and reproducing information for a first optical information recording medium having a protective substrate having a thickness t1;
    a second light source to emit a light flux of a wavelength λ2 (λ1<λ2) for conducting at least one of recording and reproducing information for a second optical information recording medium having a protective substrate having a thickness t2 (t1≦t2);
    a third light source to emit a light flux of a wavelength λ3 (λ2<λ3) for conducting at least one of recording and reproducing information for a third optical information recording medium having a protective substrate having a thickness t3 (t2<t3); and
    an objective lens comprising a diffractive structure;
    wherein an infinite parallel light flux comes into the objective lens when at least one of recording and reproducing information is conducted for the first, second and third optical information recording mediums,
    wherein the objective lens forms a converged-light spot sufficient for conducting at least one of reproducing and recording information at least for the first optical information recording medium and generates different order diffracted-light ray for the light flux of the wavelength λ2 or the light flux of the wavelength λ3 from the order of a diffracted-light ray of the light flux of the wavelength λ1,
    wherein the diffractive structure of the objective lens comprises superimposed first and second structures,
    wherein the first structure generates 2nd order diffracted-light ray for the light flux of the wavelength λ1, 1st order diffracted-light ray for the light flux of the wavelength λ2, and 1st order diffracted-light ray for the light flux of the wavelength λ3; and
    wherein the second structure generates 0th order diffracted-light ray for the light flux of the wavelength λ1, 0th order diffracted-light ray for the light flux of the wavelength λ2, and 1st order diffracted-light ray for the light flux of the wavelength λ3.

2. The optical pickup apparatus of claim 1, wherein the objective lens is a single lens.

3. The optical pickup apparatus of claim 1, wherein the objective lens is plural lenses.

4. An objective lens for an optical pickup apparatus, the optical pickup apparatus comprising:
    a first light source to emit a light flux of a wavelength λ1 for conducting at least one of recording and reproducing information for a first optical information recording medium having a protective substrate having a thickness t1;
    a second light source to emit a light flux of a wavelength λ2 (λ1<λ2) for conducting at least one of recording and reproducing information for a second optical information recording medium having a protective substrate having a thickness t2 (t1≦t2);
    a third light source to emit a light flux of a wavelength λ3 (λ2<λ3) for conducting at least one of recording and reproducing information for a third optical information recording medium having a protective substrate having a thickness t3 (t2<t3); and
    the objective lens comprising a first diffractive structure;
    wherein the objective lens forms a converged-light spot sufficient for conducting at least one of reproducing and recording information at least for the first optical information recording medium and generates different order diffracted-light ray for the light flux of the wavelength λ2 or the light flux of the wavelength λ3 from the order of a diffracted-light ray of the light flux of the wavelength λ1;
    wherein the diffractive structure of the objective lens comprises superimposed first and second structures;
    wherein the first structure generates 2nd order diffracted-light ray for the light flux of the wavelength λ1, 1st order diffracted-light ray for the light flux of the wavelength λ2, and 1st order diffracted-light ray for the light flux of the wavelength λ3; and
    wherein the second structure generates 0th order diffracted-light ray for the light flux of the wavelength λ1, 0th order diffracted-light ray for the light flux of the wavelength λ2, and 1st order diffracted-light ray for the light flux of the wavelength λ3.

5. The optical pickup apparatus of claim 4, wherein the objective lens is a single lens.

* * * * *